United States Patent
Lei et al.

(10) Patent No.: US 11,284,434 B2
(45) Date of Patent: Mar. 22, 2022

(54) INTER-CELL COORDINATION OF RANDOM ACCESS CHANNEL TRANSMISSION

(71) Applicant: QUALCOMM Incorporated, San Diego, CA (US)

(72) Inventors: Jing Lei, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/852,222

(22) Filed: Apr. 17, 2020

(65) Prior Publication Data

US 2020/0367284 A1 Nov. 19, 2020

Related U.S. Application Data

(60) Provisional application No. 62/847,733, filed on May 14, 2019.

(51) Int. Cl.
*H04W 74/08* (2009.01)
*H04W 74/00* (2009.01)
*H04W 74/02* (2009.01)

(52) U.S. Cl.
CPC ..... *H04W 74/0808* (2013.01); *H04W 74/008* (2013.01); *H04W 74/02* (2013.01); *H04W 74/0841* (2013.01)

(58) Field of Classification Search
CPC ... H04W 24/02; H04W 74/008; H04W 74/02; H04W 74/0808; H04W 74/0841
See application file for complete search history.

(56) References Cited

U.S. PATENT DOCUMENTS

2011/0158104 A1* 6/2011 Frenger ............. H04W 74/0833
370/241
2015/0327218 A1* 11/2015 Kim ..................... H04W 74/08
370/329

OTHER PUBLICATIONS

CMCC: "Discussion on Backhaul Information Exchange for CLI Management", 3GPP Draft, 3GPP TSG-RAN WG1 Meeting #96, R1-1902333, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600027, 3 pages, Retrieved from the Internet: URL: http://www.3gpp.org/ftp/tsg%5Fran/WG1%5FRL1/TSGR1%5F96/Docs/R1%2D1902333%2Ezip. [retrieved on Feb. 16, 2019] the whole document.
(Continued)

*Primary Examiner* — Kashif Siddiqui
(74) *Attorney, Agent, or Firm* — Qualcomm Incorporated

(57) ABSTRACT

Methods, systems, and devices for wireless communications are described. In some cases, inter-cell interference may occur for one or more random access channel (RACH) transmissions. To mitigate the inter-cell interference, one or more based stations may use inter-cell coordination to exchange configuration information associated with RACH procedures. Accordingly, each base station may select cell-specific RACH configurations to mitigate the inter-cell interference based on the exchanged configuration information and transmit the cell-specific RACH configurations to user equipments (UEs) served by each base station. In some cases, each base station and the corresponding UEs may use the cell-specific RACH configurations for a two-step RACH procedure that includes a first RACH message transmitted from a UE to the base station and a second RACH message transmitted from the base station to the UE. As described herein, the cell-specific RACH configurations may differ by at least one parameter to avoid the inter-cell interference.

27 Claims, 18 Drawing Sheets

(56) References Cited

OTHER PUBLICATIONS

International Search Report and Written Opinion—PCT/US2020/029019—ISA/EPO—dated Jun. 30, 2020 (192764WO).
Nokia, et al., "Inter-IAB Node CLI Measurements", 3GPP Draft, 3GPP TSG RAN Meeting #82, RP-182587, Inter-IAB Node CLI Measurements, 3rd Generation Partnership Project (3GPP), Mobile Competence Centre, 650, Route Des Lucioles, F-06921 Sophia-Antipolis Cedex, France, vol. TSG RAN, No. Sorrento, Italy, Dec. 10, 2018-Dec. 13, 2018, Dec. 9, 2018 (Dec. 9, 2018), XP051553226, 2 pages, Retrieved from the Internet: URL: http://www.3gpp.org/ftp/Meetings%5F3GPP%5FSYNC/RAN/Docs/RP%2D182587%2Ezip. [retrieved on Dec. 9, 2018] the whole document.
Panasonic: "Discussion on 2-step RACH proceduren", 3GPP Draft, 3GPP TSG RAN WG1 #97, R1-1906864, 3rd Generation Partnership Project (3GPP), Mobile Competence Centre, 650, Route Des Lucioles, F-06921 Sophia-Antipolis Cedex, France, vol. RAN WG1, No. Reno, USA, Mayy 13, 2019-May 17, 2019, May 13, 2019 (May 13, 2019), XP051728315, 7 pages, Retrieved from the Internet: URL: http://www.3gpp.org/ftp/Meetings%5F3GPP%5FSYNC/RAN1/Docs/R1%2D1906864%2Ezip. [retrieved on May 13, 2019] the whole document.
ZTE: "NR RACH Optimization", 3GPP Draft, 3GPP TSG-RAN WG3 Meeting# 104, R3-192319, 3rd Generation Partnership Project (3GPP), Mobile Competence Centre, 650, Route Des Lucioles, F-06921 Sophia-Antipolis Cedex, France, vol. RAN WG3, No. Reno, US, May 13, 2019-May 17, 2019, May 13, 2019 (May 13, 2019), XP051731605, 5 pages, Retrieved from the Internet: URL: http://www.3gpp.org/ftp/Meetings%5F3GPP%5FSYNC/RAN3/Docs/R3%2D192319%2Ezip. [retrieved on May 13, 2019] the whole document.

* cited by examiner

INTER-CELL COORDINATION OF RANDOM ACCESS CHANNEL TRANSMISSION

CROSS REFERENCE

The present Application for Patent claims the benefit of U.S. Provisional Patent Application No. 62/847,733 by LEI et al., entitled "INTER-CELL COORDINATION OF RANDOM ACCESS CHANNEL TRANSMISSION," filed May 14, 2019, assigned to the assignee hereof, and expressly incorporated by reference herein.

BACKGROUND

The following relates generally to wireless communications, and more specifically to inter-cell coordination of random access channel (RACH) transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). When connecting to a base station to receive and/or transmit subsequent communications, a UE may perform a RACH procedure to establish the connection with the base station. Efficient techniques are desired for determining configuration(s) for transmitting and receiving one or more messages of the RACH procedure.

SUMMARY

The described techniques relate to improved methods, systems, devices, and apparatuses that support inter-cell coordination of RACH transmission. Generally, the described techniques provide for multiple base stations (e.g., or cells on one or more base stations) to exchange configuration information associated with RACH procedures. Accordingly, each base station of the multiple base stations may select cell-specific RACH configurations to mitigate inter-cell interference with the other base stations or cells of the multiple base stations based on the exchanged configuration information and transmit the cell-specific RACH configurations to UEs served by each base station. In some cases, each base station and the corresponding UEs may use the cell-specific RACH configurations for a two-step RACH procedure that includes a first RACH message transmitted from a UE to the base station and a second RACH message transmitted from the base station to the UE.

As described herein, the cell-specific RACH configuration may include a cell-specific resource configuration for a preamble transmission of the first RACH message (e.g., via a preamble sequence, a transmission occasion for the preamble transmission, etc.), a cell-specific resource configuration for a payload transmission of the first RACH message (e.g., via a base sequence, an antenna port mapping scheme, a transmission occasion for the payload transmission, etc.), a beam configuration for receiving the first RACH message, a cell-specific muting pattern, a scrambling set extension of reference signal extensions, a hopping pattern of reference signals, a resource block (RB) hopping pattern, a power control configuration, a RACH type configuration, a beam configuration for transmitting the first RACH message, a cell identifier, or a combination thereof. Additionally, the UE and/or base station may perform a scrambling on the first RACH message or second RACH message, respectively, based on information included in the cell-specific RACH configuration.

A method of wireless communications by a first base station is described. The method may include exchanging RACH configuration information with a second base station, selecting a cell-specific RACH configuration to mitigate inter-cell interference with the second base station based on the RACH configuration information, and transmitting the cell-specific RACH configuration to a UE served by the first base station.

An apparatus for wireless communications by a first base station is described. The apparatus may include a processor, memory in electronic communication with the processor, and instructions stored in the memory. The instructions may be executable by the processor to cause the apparatus to exchange RACH configuration information with a second base station, to select a cell-specific RACH configuration to mitigate inter-cell interference with the second base station based on the RACH configuration information, and to transmit the cell-specific RACH configuration to a UE served by the first base station.

Another apparatus for wireless communications by a first base station is described. The apparatus may include means for exchanging RACH configuration information with a second base station, means for selecting a cell-specific RACH configuration to mitigate inter-cell interference with the second base station based on the RACH configuration information, and means for transmitting the cell-specific RACH configuration to a UE served by the first base station.

A non-transitory computer-readable medium storing code for wireless communications by a first base station is described. The code may include instructions executable by a processor to exchange RACH configuration information with a second base station, to select a cell-specific RACH configuration to mitigate inter-cell interference with the second base station based on the RACH configuration information, and to transmit the cell-specific RACH configuration to a UE served by the first base station.

Some examples of the method, apparatuses, and non-transitory computer-readable medium described herein may further include operations, features, means, or instructions for receiving, from the UE, a RACH transmission based on the cell-specific RACH configuration, and transmitting, to the UE, a RACH response based on the RACH transmission.

In some examples of the method, apparatuses, and non-transitory computer-readable medium described herein, transmitting the cell-specific RACH configuration may include operations, features, means, or instructions for transmitting a cell-specific resource configuration for a preamble.

In some examples of the method, apparatuses, and non-transitory computer-readable medium described herein, the cell-specific resource configuration may indicate a first preamble sequence from a set of different preamble sequences, where receiving the RACH transmission may include operations, features, means, or instructions for receiving the RACH transmission that includes the preamble generated based on the first preamble sequence.

In some examples of the method, apparatuses, and non-transitory computer-readable medium described herein, the cell-specific resource configuration may indicate a first transmission occasion from a set of different transmission occasions, where receiving the RACH transmission may include operations, features, means, or instructions for receiving the RACH transmission within the first transmission occasion.

In some examples of the method, apparatuses, and non-transitory computer-readable medium described herein, transmitting the cell-specific RACH configuration may include operations, features, means, or instructions for transmitting a cell-specific resource configuration for a payload.

In some examples of the method, apparatuses, and non-transitory computer-readable medium described herein, the cell-specific resource configuration may indicate a first base sequence from a set of different base sequences, where receiving the RACH transmission may include operations, features, means, or instructions for receiving the RACH transmission that includes the payload generated based on the first base sequence.

In some examples of the method, apparatuses, and non-transitory computer-readable medium described herein, the cell-specific resource configuration may indicate a first antenna port mapping scheme from a set of different antenna port mapping schemes, where receiving the RACH transmission may include operations, features, means, or instructions for receiving the RACH transmission based on the first antenna port mapping scheme.

In some examples of the method, apparatuses, and non-transitory computer-readable medium described herein, the cell-specific resource configuration may indicate a first transmission occasion from a set of different transmission occasions, where receiving the RACH transmission may include operations, features, means, or instructions for receiving the RACH transmission within the first transmission occasion.

In some examples of the method, apparatuses, and non-transitory computer-readable medium described herein, transmitting the cell-specific RACH configuration may include operations, features, means, or instructions for transmitting the cell-specific RACH configuration that indicates a cell-specific muting pattern configuration, where receiving the RACH transmission may include operations, features, means, or instructions for receiving the RACH transmission in accordance with the cell-specific muting pattern configuration.

In some examples of the method, apparatuses, and non-transitory computer-readable medium described herein, transmitting the cell-specific RACH configuration may include operations, features, means, or instructions for transmitting a beam configuration that indicates a first transmission beam from a set of different transmission beams, where receiving the RACH transmission may include operations, features, means, or instructions for receiving the RACH transmission using a receive beam corresponding to the first transmission beam.

In some examples of the method, apparatuses, and non-transitory computer-readable medium described herein, transmitting the cell-specific RACH configuration may include operations, features, means, or instructions for transmitting the cell-specific RACH configuration that indicates a scrambling set extension of reference signal sequences, where receiving the RACH transmission may include operations, features, means, or instructions for receiving the RACH transmission that includes a payload scrambled based on the scrambling set extension of the reference signal sequences.

In some examples of the method, apparatuses, and non-transitory computer-readable medium described herein, transmitting the cell-specific RACH configuration may include operations, features, means, or instructions for transmitting the cell-specific RACH configuration that indicates a hopping pattern of reference signal sequences across different symbols, where receiving the RACH transmission may include operations, features, means, or instructions for receiving the RACH transmission based on the hopping pattern.

In some examples of the method, apparatuses, and non-transitory computer-readable medium described herein, transmitting the cell-specific RACH configuration may include operations, features, means, or instructions for transmitting the cell-specific RACH configuration that indicates an RB hopping pattern for a reference signal, a shared data channel transmission, or both, where receiving the RACH transmission may include operations, features, means, or instructions for receiving the RACH transmission based on the RB hopping pattern.

In some examples of the method, apparatuses, and non-transitory computer-readable medium described herein, transmitting the cell-specific RACH configuration may include operations, features, means, or instructions for transmitting the cell-specific RACH configuration that indicates a power control configuration, where receiving the RACH transmission may include operations, features, means, or instructions for receiving the RACH transmission based on the power control configuration.

In some examples of the method, apparatuses, and non-transitory computer-readable medium described herein, transmitting the cell-specific RACH configuration may include operations, features, means, or instructions for transmitting the cell-specific RACH configuration that indicates a RACH type configuration, where receiving the RACH transmission may include operations, features, means, or instructions for receiving the RACH transmission based on the RACH type configuration.

In some examples of the method, apparatuses, and non-transitory computer-readable medium described herein, transmitting the cell-specific RACH configuration may include operations, features, means, or instructions for transmitting the cell-specific RACH configuration that indicates a transmit beam coordination configuration, where receiving the RACH transmission may include operations, features, means, or instructions for receiving the RACH transmission based on the transmit beam coordination configuration.

In some examples of the method, apparatuses, and non-transitory computer-readable medium described herein, transmitting the cell-specific RACH configuration may include operations, features, means, or instructions for signaling a cell identifier of the first base station, a preamble identifier, or both, where receiving the RACH transmission may include operations, features, means, or instructions for receiving the RACH transmission that comprises a payload scrambled based on the cell identifier of the first base station, the preamble identifier, or both.

Some examples of the method, apparatuses, and non-transitory computer-readable medium described herein may further include operations, features, means, or instructions for performing scrambling of a reference signal sequence to generate a scrambled reference signal sequence based on a preamble sequence identifier and a scrambling configuration indicated in the cell-specific RACH configuration, where receiving the RACH transmission may include operations, features, means, or instructions for receiving the RACH transmission that includes the scrambled reference signal sequence.

In some examples of the method, apparatuses, and non-transitory computer-readable medium described herein, the RACH configuration information may indicate a time allocation, a frequency allocation, or both, for a preamble.

A method of wireless communications by a UE is described. The method may include receiving, from a first base station, a cell-specific RACH configuration selected to mitigate inter-cell interference with a second base station, transmitting a RACH transmission based on the cell-specific RACH configuration, and receiving, from the first base station, a RACH response based on the RACH transmission.

An apparatus for wireless communications by a UE is described. The apparatus may include a processor, memory in electronic communication with the processor, and instructions stored in the memory. The instructions may be executable by the processor to cause the apparatus to receive, from a first base station, a cell-specific RACH configuration selected to mitigate inter-cell interference with a second base station, to transmit a RACH transmission based on the cell-specific RACH configuration, and to receive, from the first base station, a RACH response based on the RACH transmission.

Another apparatus for wireless communications by a UE is described. The apparatus may include means for receiving, from a first base station, a cell-specific RACH configuration selected to mitigate inter-cell interference with a second base station, means for transmitting a RACH transmission based on the cell-specific RACH configuration, and means for receiving, from the first base station, a RACH response based on the RACH transmission.

A non-transitory computer-readable medium storing code for wireless communications by a UE is described. The code may include instructions executable by a processor to receive, from a first base station, a cell-specific RACH configuration selected to mitigate inter-cell interference with a second base station, to transmit a RACH transmission based on the cell-specific RACH configuration, and to receive, from the first base station, a RACH response based on the RACH transmission.

In some examples of the method, apparatuses, and non-transitory computer-readable medium described herein, receiving the cell-specific RACH configuration may include operations, features, means, or instructions for receiving a cell-specific resource configuration for a preamble.

In some examples of the method, apparatuses, and non-transitory computer-readable medium described herein, the cell-specific resource configuration may indicate a first preamble sequence from a set of different preamble sequences, where transmitting the RACH transmission may include operations, features, means, or instructions for generating a preamble based on the first preamble sequence and transmitting the RACH transmission that includes the preamble.

In some examples of the method, apparatuses, and non-transitory computer-readable medium described herein, the cell-specific resource configuration may indicate a first transmission occasion from a set of different transmission occasions, where transmitting the RACH transmission may include operations, features, means, or instructions for transmitting the RACH transmission within the first transmission occasion.

In some examples of the method, apparatuses, and non-transitory computer-readable medium described herein, receiving the cell-specific RACH configuration may include operations, features, means, or instructions for receiving a cell-specific resource configuration for a payload.

In some examples of the method, apparatuses, and non-transitory computer-readable medium described herein, the cell-specific resource configuration may indicate a first base sequence from a set of different base sequences, where transmitting the RACH transmission may include operations, features, means, or instructions for generating the payload based on the first base sequence and transmitting the RACH transmission that includes the payload.

In some examples of the method, apparatuses, and non-transitory computer-readable medium described herein, the cell-specific resource configuration may indicate a first antenna port mapping scheme from a set of different antenna port mapping schemes, where transmitting the RACH transmission may include operations, features, means, or instructions for transmitting the RACH transmission based on the first antenna port mapping scheme.

In some examples of the method, apparatuses, and non-transitory computer-readable medium described herein, the cell-specific resource configuration may indicate a first transmission occasion from a set of different transmission occasions, where transmitting the RACH transmission may include operations, features, means, or instructions for transmitting the RACH transmission within the first transmission occasion.

In some examples of the method, apparatuses, and non-transitory computer-readable medium described herein, receiving the cell-specific RACH configuration may include operations, features, means, or instructions for receiving the cell-specific RACH configuration that indicates a cell-specific muting pattern configuration, where transmitting the RACH transmission includes transmitting the RACH transmission in accordance with the cell-specific muting pattern configuration.

In some examples of the method, apparatuses, and non-transitory computer-readable medium described herein, receiving the cell-specific RACH configuration may include operations, features, means, or instructions for receiving a beam configuration that indicates a first transmission beam from a set of different transmission beams, where transmitting the RACH transmission includes transmitting the RACH transmission using the first transmission beam.

In some examples of the method, apparatuses, and non-transitory computer-readable medium described herein, receiving the cell-specific RACH configuration may include operations, features, means, or instructions for receiving the cell-specific RACH configuration that indicates a scrambling set extension of reference signal sequences, where transmitting the RACH transmission includes scrambling a payload to generate a scrambled payload based on the scrambling set extension of the reference signal sequences, and transmitting the RACH transmission that includes the scrambled payload.

In some examples of the method, apparatuses, and non-transitory computer-readable medium described herein, receiving the cell-specific RACH configuration may include operations, features, means, or instructions for receiving the cell-specific RACH configuration that indicates a hopping pattern of reference signal sequences across different symbols, where transmitting the RACH transmission includes transmitting the RACH transmission based on the hopping pattern.

In some examples of the method, apparatuses, and non-transitory computer-readable medium described herein, receiving the cell-specific RACH configuration may include operations, features, means, or instructions for receiving the cell-specific RACH configuration that indicates an RB hopping pattern for a reference signal, a shared data channel transmission, or both, where transmitting the RACH transmission includes transmitting the RACH transmission based on the RB hopping pattern.

In some examples of the method, apparatuses, and non-transitory computer-readable medium described herein, receiving the cell-specific RACH configuration may include operations, features, means, or instructions for receiving the cell-specific RACH configuration that indicates a power control configuration, where transmitting the RACH transmission includes transmitting the RACH transmission based on the power control configuration.

In some examples of the method, apparatuses, and non-transitory computer-readable medium described herein, receiving the cell-specific RACH configuration may include operations, features, means, or instructions for receiving the cell-specific RACH configuration that indicates a RACH type configuration, where transmitting the RACH transmission includes transmitting the RACH transmission based on the RACH type configuration.

In some examples of the method, apparatuses, and non-transitory computer-readable medium described herein, receiving the cell-specific RACH configuration may include operations, features, means, or instructions for receiving the cell-specific RACH configuration that indicates a transmit beam coordination configuration, where transmitting the RACH transmission includes transmitting the RACH transmission based on the transmit beam coordination configuration.

Some examples of the method, apparatuses, and non-transitory computer-readable medium described herein may further include operations, features, means, or instructions for performing bit scrambling of a payload to generate a scrambled payload based on a cell identifier of the first base station, a preamble identifier, or both, where transmitting the RACH transmission includes transmitting the RACH transmission that includes the scrambled payload.

Some examples of the method, apparatuses, and non-transitory computer-readable medium described herein may further include operations, features, means, or instructions for performing scrambling of a reference signal sequence to generate a scrambled reference signal sequence based on a preamble sequence identifier and a scrambling configuration indicated in the cell-specific RACH configuration, where transmitting the RACH transmission includes transmitting the RACH transmission that includes the scrambled reference signal sequence.

DETAILED DESCRIPTION

Figure 1:
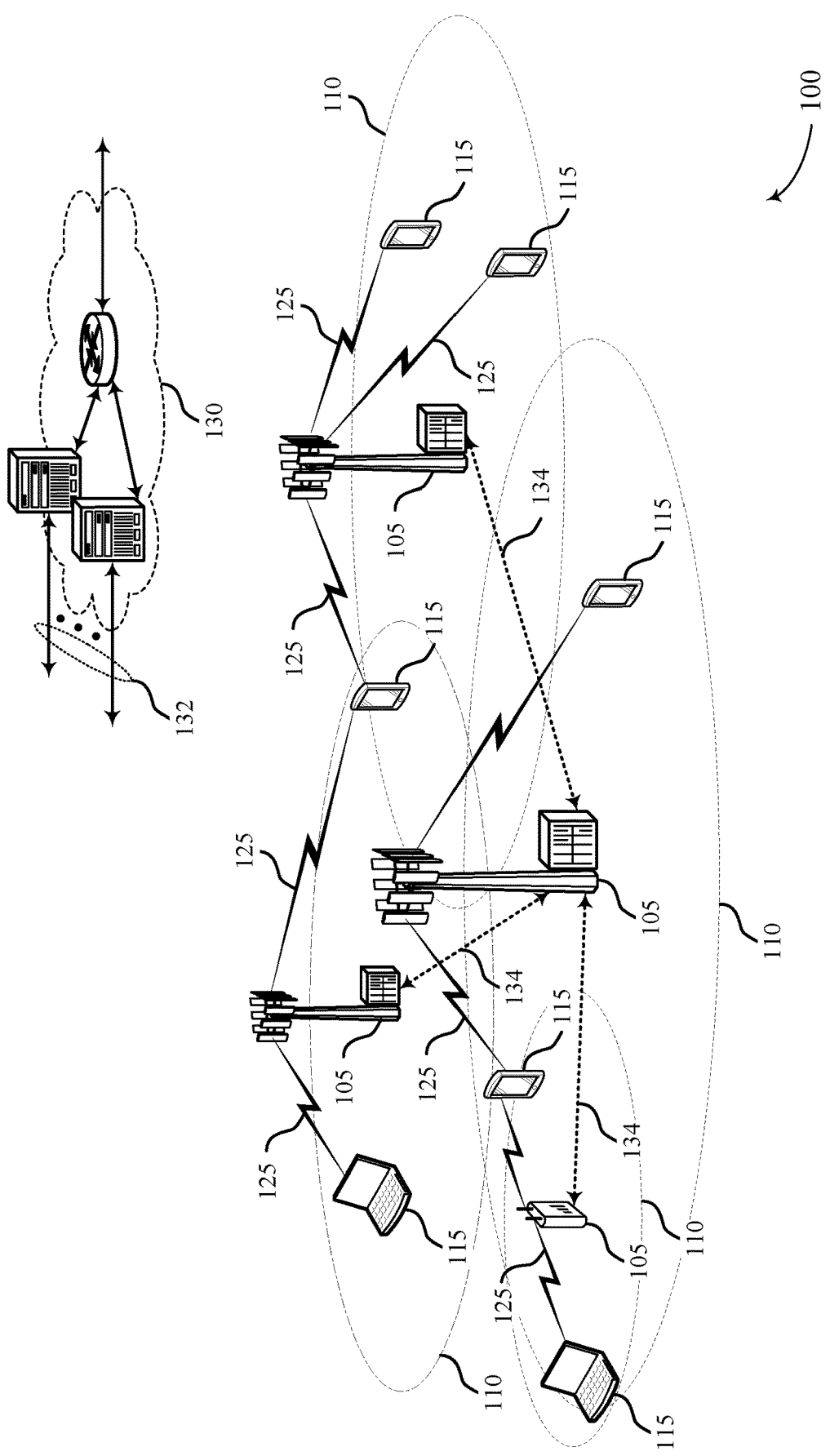
FIG. 1 illustrates an example of a system for wireless communications that supports inter-cell coordination of RACH transmission in accordance with aspects of the present disclosure.

Some wireless communications systems may include multiple base stations communicating with one or more UEs in corresponding coverage areas for each base station. In some cases, one or more base stations may cause interferences at additional nearby base stations (e.g., adjacent base stations). For example, collisions may occur based on multiple base stations attempting to use same resources (e.g., in a time domain, frequency domain, code domain, etc.) for communications with respective UEs for each base station. As described herein, when establishing a connection, a base station and a UE may perform a two-step RACH procedure that includes a first RACH message (e.g., including a preamble portion and a payload portion) transmitted from the UE to the base station and a second RACH message (e.g., a RACH response message) transmitted from the base station to the UE.

In some cases, multiple base stations may indicate configurations to respective UEs in each of their coverage areas for transmitting the first RACH message, where the configurations include one or more same parameters for transmitting the first RACH message. Accordingly, interference may occur when one or more UEs attempt to use the same parameters for the first RACH message transmission. For example, a first UE attempting to establishing a connection with a first base station may transmit a first RACH message on a same set of resources as a second UE attempting to establish a connection with a second base station that neighbors the first base station, thereby resulting in each of the base stations experiencing interference and potentially not being able to discern which UE is transmitting on the resources. This type of interference may be referred to as inter-cell interference. In some cases, each base station may include a single cell, or multiple cells may be located on a single base station, where the inter-cell interference occurs across the multiple base stations, multiple cells on the single base station, or a combination thereof.

To mitigate the inter-cell interference, an inter-cell coordination for two-step RACH transmissions may be established between the multiple base stations (e.g., cells). As described herein, the multiple base stations (e.g., or cells on one or more base stations) may exchange configuration information associated with two-step RACH procedures. Accordingly, each base station of the multiple base stations may select cell-specific RACH configurations to mitigate the inter-cell interference based on the exchanged configuration information and transmit the cell-specific RACH configurations to their respective UEs. In some cases, the cell-specific RACH configuration may include a cell-specific resource configuration for a preamble transmission of the first RACH message (e.g., via a preamble sequence, a transmission occasion for the preamble transmission, etc.), a cell-specific resource configuration for a payload transmission of the first RACH message (e.g., via a base sequence, an antenna port mapping scheme, a transmission occasion for the payload transmission, etc.), a beam configuration for receiving the first RACH message, a cell-specific muting pattern, a scrambling set extension of reference signal extensions, a hopping pattern of reference signals, an RB hopping pattern, a power control configuration, a RACH type configuration, a beam configuration for transmitting the first RACH message, a cell identifier, or a combination thereof. Additionally, the UE and/or base station may perform a scrambling on the first RACH message or second RACH message, respectively, based on information included in the cell-specific RACH configuration.

Aspects of the disclosure are initially described in the context of a wireless communications system. Additionally, aspects of the disclosure are illustrated by an additional wireless communications system, a transmit chain, and process flow examples. Aspects of the disclosure are further illustrated by and described with reference to apparatus diagrams, system diagrams, and flowcharts that relate to inter-cell coordination of RACH transmission.

FIG. 1 illustrates an example of a wireless communications system 100 that supports inter-cell coordination of RACH transmission in accordance with aspects of the present disclosure. The wireless communications system 100 includes base stations 105, UEs 115, and a core network 130. In some examples, the wireless communications system 100 may be a LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 134 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more system information blocks (SIBs). For example, a first SIB (SIB1) may contain cell access parameters and scheduling information for other SIBs. Decoding SIB1 may enable the UE 115 to receive a second SIB (SIB2). SIB2 may contain RRC configuration information related to RACH procedures, paging, physical uplink control channel (PUCCH), physical uplink shared channel (PUSCH), power control, sounding reference signal (SRS), and cell barring.

After completing initial cell synchronization, a UE 115 may decode the MIB, SIB1, and SIB2 prior to accessing the network. The MIB may be transmitted on PBCH and may utilize the first four (4) OFDMA symbols of the second slot of the first subframe of each radio frame. Additionally, the MIB may use the middle 6 RBs (72 subcarriers) in the frequency domain. The MIB may carry a few important pieces of information for UE initial access, including: downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may try different phases of a scrambling code until the UE 115 gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE 115 may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 may include access information, including cell identity information and may indicate whether a UE 115 is allowed to camp on a cell. SDB1 may also include cell selection information (or cell selection parameters). Additionally, SIB1 may include scheduling information for other SIBs. SIB2 may be scheduled dynamically according to information in SIB1 and may include access information and parameters related to common and shared channels. The periodicity of SIB2 can be set to 8, 16, 32, 64, 128, 256 or 512 radio frames.

After the UE 115 decodes SIB2, the UE 115 may transmit a RACH preamble (e.g., a message 1 (Msg1) in a four-step RACH procedure) to a base station 105. For example, the RACH preamble may be randomly selected from a set of 64 predetermined sequences. This random selection may enable the base station 105 to distinguish between multiple UEs 115 trying to access the system simultaneously. The base station 105 may respond with a random access response (e.g., a second message (Msg2)) that provides an uplink resource grant, a timing advance (TA), and a temporary cell radio network temporary identifier (C-RNTI). The UE 115 may then transmit an RRC connection request (e.g., a third message (Msg3)) along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message (e.g., a fourth message (Msg4)) addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115), the UE 115 may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid TA. For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure.

The two-step RACH procedure may be applicable to any cell size supported in a wireless communications system, may be able to operate regardless of if a UE 115 has a valid TA or not, and may be applied to any RRC state of the UE 115 (e.g., an idle state (RRC_IDLE), an inactive state (RRC_INACTIVE), a connected state (RRC_CONNECTED), etc.). In some cases, the two-step RACH procedure may result in a reduction in signaling overhead and latency, an enhanced RACH capacity, power savings for the UE 115, and provide synergy with other applications (e.g., positioning, mobility enhancement, etc.).

In some network deployment scenarios (e.g., for NR), two-step RACH procedures and four-step RACH procedures may be used simultaneously to meet different conditions for the system. For example, the different conditions may include capacity conditions, latency conditions, reliability conditions, implementation complexity specifications, etc. Accordingly, different transmission occasions may be defined that can be used for both or either RACH procedure. For example, the different transmission occasions may include RACH occasions and uplink shared channel (e.g., PUSCH) occasions. The RACH occasions may include time and frequency resources allocated for physical RACH (PRACH) transmissions. Additionally, up to 64 preamble sequences may be configured for each RACH occasions. In some cases, a two-step RACH procedure may use RACH occasions separate from a four-step RACH procedure or may share RACH occasions with a four-step RACH procedure but use different sets of preamble sequences. Additionally or alternatively, the uplink shared channel occasions (e.g., PUSCH occasions) may include time and frequency resources allocated for MsgA PUSCH transmissions (e.g., and/or for transmissions associated with the four-step RACH procedure).

As opposed to the Msg3 transmissions for a four-step RACH procedure, multiple UEs 115 attempting a two-step RACH procedure may be multiplexed together on a same set of resources (e.g., time-frequency resources, code domain resources, or a combination thereof) for the MsgA transmission. For example, a base station 105 may specifically configure the Msg3 transmission for each UE 115 and indicate this configuration in the Msg2. However, the MsgA transmission of the two-step RACH may include information conventionally included in the Msg3 transmission, but MsgA may be transmitted prior to receiving a response message from the base station 105 (e.g., via MsgB). Accordingly, each base station 105 may transmit general configuration information for the two-step RACH procedures to UEs 115 in a corresponding geographic coverage area 110 of each base station 105, where the UEs 115 may be multiplexed together on the same resources. Additionally, by using a two-step RACH procedure, the RACH capacity may increase at a target cell (e.g., target base station 105), for example, based on being able to multiplex the UEs 115.

However, inter-cell interference may also increase based on collision in different domains (e.g., time domain, frequency domain, code domain, etc.) for MsgA transmissions (e.g., for a preamble, demodulation reference signal (DMRS), and/or PUSCH transmissions of the MsgA). For example, multiple base stations 105 may indicate configurations to respective UEs 115 in each of their coverage areas 110 for transmitting a MsgA, where the configurations include one or more same parameters for transmitting MsgA. Accordingly, interference may occur when one or more UEs 115 attempt to use the same parameters for the MsgA transmission. For example, a first UE 115 attempting to establishing a connection with a first base station 105 may transmit a MsgA on a same set of resources as a second UE 115 attempting to establish a connection with a second base station 105 that neighbors the first base station 105, thereby resulting in each of the base stations 105 not being able to discern which UE 115 is transmitting on the resources. This type of interference may be referred to as inter-cell interference. In some cases, each base station 105 may include a single cell, or multiple cells may be located on a single base station 105, where the inter-cell interference occurs across the multiple base stations 105, multiple cells on the single base station 105, or a combination thereof.

Wireless communications system 100 may support efficient techniques for mitigating inter-cell interference for a two-step RACH procedure and balancing RACH capacity in adjacent cells. For example, multiple base stations 105 (e.g., or cells on one or more base stations 105) may exchange configuration information associated with two-step RACH procedures. Accordingly, each base station 105 of the multiple base stations 105 may select cell-specific RACH configurations to mitigate the inter-cell interference with each of the other multiple base stations 105 based on the exchanged configuration information and transmit the cell-specific RACH configurations to respective UEs 115 attempting communications with each base station 105. In some cases, the cell-specific RACH configuration may include a cell-specific resource configuration for a preamble transmission of a MsgA (e.g., via a preamble sequence, a transmission occasion for the preamble transmission, etc.), a cell-specific resource configuration for a payload transmission of the MsgA (e.g., via a base sequence, antenna port mapping scheme, a transmission occasion for the payload transmission, etc.), a beam configuration for receiving the MsgA, a cell-specific muting pattern, a scrambling set extension of reference signal extensions (e.g., DMRS extensions), a hopping pattern of reference signals, an RB hopping pattern, a power control configuration, a RACH type configuration (e.g., two-step RACH, four-step RACH, etc.), a beam configuration for transmitting the MsgA, a cell identifier, or a combination thereof. Additionally, the UE 115 and/or base station 105 may perform a scrambling on the MsgA or a MsgB transmission, respectively, based on information included in the cell-specific RACH configuration.

Figure 2:
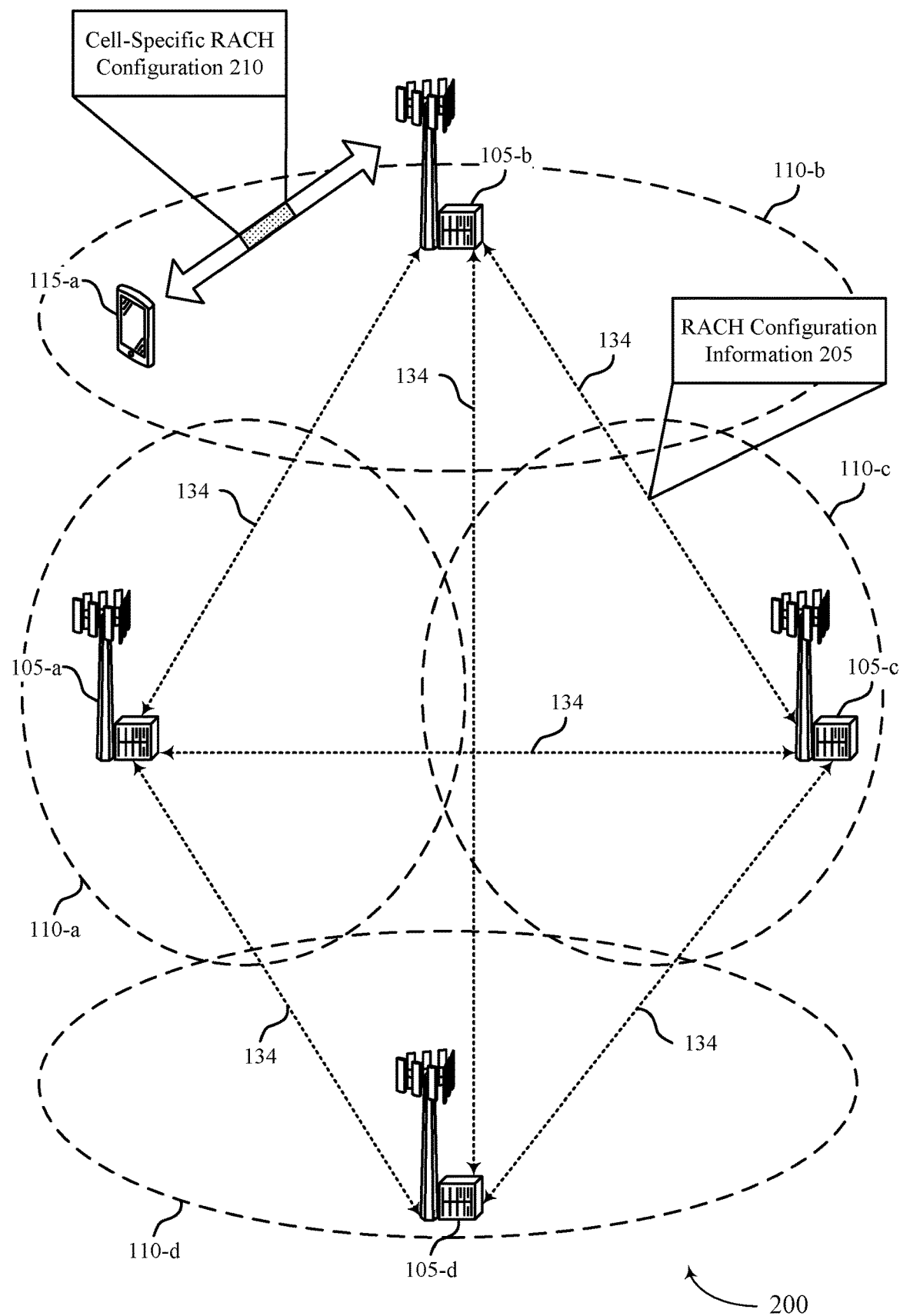
FIG. 2 illustrates an example of a wireless communications system that supports inter-cell coordination of RACH transmission in accordance with aspects of the present disclosure.

FIG. 2 illustrates an example of a wireless communications system 200 that supports inter-cell coordination of RACH transmission in accordance with aspects of the present disclosure. In some examples, wireless communications system 200 may implement aspects of wireless communications system 100. Wireless communications system 200 may include a first base station 105-a, a second base station 105-b, a third base station 105-c, and a fourth base station 105-d, which may be examples of corresponding base stations 105 as described above with reference to FIG. 1. While shown as separate base stations 105, it is to be understood that each of first base station 105-a, second base station 105-b, third base station 105-c, and fourth base station 105-d may represent a separate cell, where the separate cells are located on a same base station 105 or different base stations 105. Each base station 105 (e.g., or cell) may include a corresponding coverage area 110, where UEs 115 in each coverage area communicate with the respective base station 105. For example, first base station 105-a may include a first coverage area 110-a, second base station 105-b may include a second coverage area 110-b, third base station 105-c may include a third coverage area 110-c, and fourth base station 105-d may include a fourth coverage area 110-d.

Additionally, wireless communications system 200 may include a UE 115-a, which may an example of a corresponding UE 115 as described above with reference to FIG. 1. In some cases, UE 115-a and base station 105-a may attempt to perform a two-step RACH procedure to establish a connection for subsequent communications. However, as described herein, inter-cell interference may occur between the different base stations 105 for UEs 115 attempting a two-step RACH procedure based on the base stations 105 using one or more same parameters (e.g., resources, scrambling identifications, preamble sequences, base sequences, etc.) for two-step RACH configurations.

To mitigate inter-cell interference and balance RACH capacity for adjacent base stations 105, the base stations 105 may employ inter-cell coordination for two-step RACH transmissions. For example, first base station 105-a, second base station 105-b, third base station 105-c, and fourth base station 105-d may collaborate to reduce chances that a MsgA transmission from UEs 115 in each coverage area 110 do not collide with each other. That is, based on other two-step RACH configurations, a scheduling base station 105 (e.g., second base station 105-b) may configure a two-step RACH to avoid inter-cell interferences and signal the configuration to UEs 115 in a coverage area 110 for the scheduling base station 105 (e.g., base station 105-a may signal a configuration for the two-step RACH to UE 115-a in coverage area 110-a, where the configuration is specific to base station 105-a). The scheduling base station 105 may then monitor for MsgA of the two-step RACH based on the configuration (e.g., from a UE 115 in the corresponding coverage area 110 of that scheduling base station 105).

Each base station 105 may communicate with the other base stations 105 via one or more backhaul links 134 and share RACH configuration information 205 (e.g., for two-step RACHs) over the backhaul links 134 with each other. Additionally or alternatively, the base stations 105 may communicate RACH configuration information 205 with each other over the air. In some cases, RACH configuration information 205 may include cell-specific resource configurations for transmission of a preamble of a MsgA. For example, the cell-specific resource configuration for the preamble may include one or more preamble sequences that UEs 115 in a corresponding coverage area 110 of a base station 105 can use for the preamble transmission and/or preamble transmission occasions (e.g., RACH occasions) in time and frequency domain (e.g., and/or code domain). Each base station 105 may attempt to select a preamble sequence and/or preamble transmission occasion for its RACH configuration that differs from the preamble sequence and/or preamble transmission occasions selected by a nearby base station 105, where the preamble sequence and/or preamble transmission is selected to avoid or reduce the likelihood of inter-cell interference. Additionally or alternatively, RACH configuration information 205 may include cell-specific resource configurations for transmission of a payload of the MsgA (e.g., DMRS and PUSCH transmissions). For example, the cell-specific resource configurations for the payload transmission may include configurations of DMRS (e.g., reference signal) base sequences, antenna port mapping schemes for transmitting the payload, and/or DMRS and PUSCH transmission occasions (e.g., PUSCH occasions) in time and frequency domain (e.g., and/or code domain). Each base station 105 may attempt to select a DMRS base sequence, antenna port mapping scheme, DMRS transmission occasions, and/or PUSCH transmission occasions in the time and frequency domains that differ from the DMRS base sequences, antenna port mapping schemes, DMRS transmission occasions, and/or PUSCH transmission occasions selected by a nearby base station 105 to avoid or reduce the likelihood of inter-cell interference.

In some cases, RACH configuration information 205 may include a cell-specific muting pattern configuration for performing a two-step RACH. For example, a base station 105 may mute communications with UEs 115 in a corresponding coverage area 110 for the base station 105 during transmission occasions for the preamble and/or payload transmissions of MsgAs used by neighboring base stations 105, or the neighboring base stations 105 may indicate transmission occasions for MsgA transmissions from corresponding UEs 115 based on when the base station 105 mutes communications with any UEs 115 in the corresponding coverage area 110. Additionally or alternatively, RACH configuration information 205 may include receive beam coordination information that each base station 105 may use for determining receive beams for receiving a MsgA from corresponding UEs 115. For example, the base stations 105 may coordinate which receive beams each can use for receiving MsgA transmissions that reduce the chance of collision or interference. Each base station 105 may attempt to select a transmit and/or receive beam configuration that differs from the transmit and/or receive beam configuration selected by a nearby base station to avoid or reduce the likelihood of inter-cell interference.

Based on RACH configuration information 205, each base station 105 may determine a cell-specific RACH configuration 210 and signal the cell-specific RACH configuration 210 to UEs 115 in a corresponding coverage area 110, where the cell-specific RACH configurations 210 are determined such that inter-cell interference is mitigated between the base stations 105. In some examples, the cell-specific RACH configuration 210 may include scrambling identification (ID) sets extension of DMRS sequences that the UEs 115 can use transmitting a MsgA, a hoping pattern of DMRS sequences across different DMRS symbols, physical RB (PRB) hopping patterns for the payload transmission of the MsgA, a power control configuration (e.g., increase or decrease a transmission power level based on an observed interference level), an indication of a type of RACH procedure (e.g., the UEs 115 may choose to use a four-step RACH if the two-step RACH causes too much interference at the base station 105), transmit beam coordination information, or a combination thereof. Accordingly, the base station 105 may attempt to select values for these different parameters for its cell-specific RACH configuration 210 for the RACH configuration information 205 that differ from at least one value for those same parameters selected by from each of the other base stations 105, where at least one parameter is different for each base station 105 to mitigate inter-cell interference.

Conventionally, a base station 105 may use two scrambling IDs for each UE 115 to perform a four-step RACH or perform other communications (e.g., for transmission of reference signals, DMRSs, etc.). For example, first base station 105-a may configure a scrambling ID set of {1, 2}, second base station 105-b may configure a scrambling ID set of {9, 10}, third base station 105-c may configure a scrambling ID set of {17, 18}, and fourth base station 105-d may configure a scrambling ID set of {25, 26}. Accordingly, with the limited choice of the scrambling IDs, the base stations 105 have a greater number of choices to use scrambling IDs that do not interfere with the other base stations 105. However, for a MsgA transmission of a two-step RACH, a base station 105 may indicate up to eight scrambling IDs that a UE 115 can use for MsgA transmissions. The higher number of possible scrambling IDs to use may provide a DMRS enhancement for transmitting MsgA of two-step RACHs by increasing the scrambling seed set (e.g., scrambling sequences) per cell (e.g., for DMRS for cyclic prefix (CP)-OFDM waveforms). For example, first base station 105-a may configure a scrambling ID set of {1, 2, . . . , 8}, second base station 105-b may configure a scrambling ID set of {9, 10, . . . 16}, third base station 105-c may configure a scrambling ID set of {17, 18, . . . 24}, and fourth base station 105-d may configure a scrambling ID set of {25, 26, . . . 32}.

In some cases (e.g., for DFT-s-OFDM waveforms), a limited number of scrambling sequences may exist based on a smaller RB length used for transmission of the MsgA. As such, the limited number of scrambling sequences may result in not enough scrambling sequences such that each base station 105 has a non-overlapping set of scrambling sequences for the DMRS enhancement of configuring up to eight scrambling IDs. For example, first base station 105-a may configure a scrambling ID set of {1, 2, . . . , 8}, second base station 105-b may configure a scrambling ID set of {9, 10, . . . 16}, and third base station 105-c may configure a scrambling ID set of {17, 18, . . . 24}, but fourth base station 105-d may configure a scrambling ID set of {1, 3, 5, . . . 15}. Accordingly, MsgA transmissions from UEs 115 in coverage area 110-a (e.g., associated with first base station 105-a) and from UEs 115 in coverage area 110-d (e.g., associated with fourth base station 105-d) have a chance of colliding (e.g., interfering with each other) based on being in neighboring coverage areas 110 and having overlapping scrambling ID choices. While the scrambling ID sets of second base station 105-b and fourth base station 105-d also partially overlap, MsgA transmissions from corresponding UEs 115 may not have as high of a chance of collision based on second base station 105-b and fourth base station 105-d being farther apart. However, there still may be a chance of collision between any base station 105 with at least one same scrambling ID as other, nearby base stations 105.

Accordingly, first base station 105-a (e.g., and/or each other base station 105) may inform a MsgA transmission configuration (or partial information on a MsgA transmission configuration) to neighboring base stations 105 (e.g., via RACH configuration information 205). For example, the MsgA transmission configuration may include a waveform type (e.g., CP-OFDM, DFT-s-OFDM, etc.), a starting RB for the MsgA transmission, a number of RBs for the MsgA transmission, scrambling sequence indices, a start symbol index, a start slot index, a periodicity of MsgA transmission occasions, or a combination thereof. Subsequently, the neighboring base stations 105 may use the received information to avoid DMRS sequence collisions. For example, the neighboring base stations 105 may select waveforms, starting RBs, numbers of RBs, etc., that differ from waveforms, starting RBs, numbers of RBs, etc., selected by one or more nearby base stations 105 to avoid the collisions (e.g., inter-cell interference). As one example, first base station 105-a may select a first set of time and frequency resources for a PUSCH occasion for corresponding UEs 115 (e.g., in coverage area 110-a, such as UE 115-a) transmitting MsgA with a first waveform (e.g., a DFT-s-OFDM waveform) and signal this information to neighboring base stations 105-b, 105-c, and 105-d (e.g., via backhaul links 134). Accordingly, fourth base station 105-d may select the same first set of time and frequency resources for a PUSCH occasion for transmitting MsgA but with a second waveform (e.g., a CP-OFDM waveform) different from the first waveform to avoid a collision (e.g., inter-cell interference).

Additionally or alternatively, when two DMRS symbols are configured for UEs 115 in a coverage area 110, nearby base station 105 may select to use different DMRS sequence hopping patterns across two different DMRS symbols to prevent collisions. For example, the number of combinations may increase to 900 different combinations (e.g., 30 scrambling IDs for a first DMRS symbol*30 scrambling IDs for a second DMRS symbol=900 combinations). For example, first base station 105-a may configure a first scrambling ID set for two DMRS symbols of {(1,1), (2,2), . . . , (8,8)} and transmit this configuration to the neighboring base stations 105. Accordingly, as an example, fourth base station 105-d may then configure a second scrambling ID set of {(1,2), (3,4), (5,6), . . . , (15,16)} using a different hopping pattern based on the first scrambling ID set of first base station 105-a.

Figure 3:
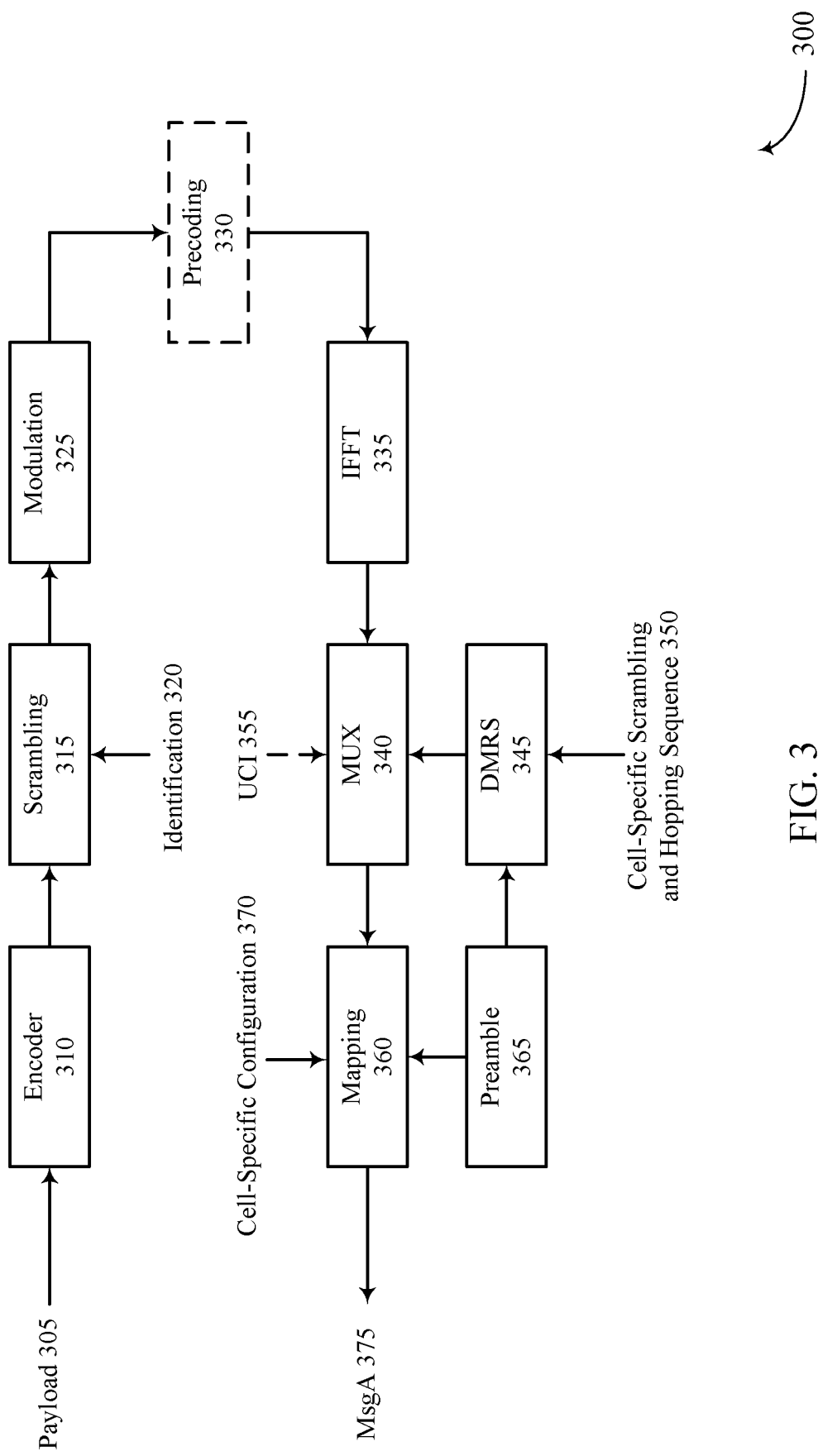
FIG. 3 illustrates an example of a transmit chain that supports inter-cell coordination of RACH transmission in accordance with aspects of the present disclosure.

FIG. 3 illustrates an example of a transmit chain 300 that supports inter-cell coordination of RACH transmission in accordance with aspects of the present disclosure. In some examples, transmit chain 300 may implement aspects of wireless communications systems 100 and/or 200. Transmit chain 300 may illustrate how a first message of a two-step RACH procedure (e.g., a MsgA 375) is configured (e.g., encoded, scrambled, mapped, etc.) by a UE 115 prior to the UE 115 transmitting the first message (e.g., to a base station 105). In some cases, as described above with reference to FIG. 2, a base station 105 may configure the UE 115 with parameters to transmit the first message (e.g., MsgA 375) such that inter-cell interference is mitigated.

The UE 115 may use an encoder 310 for encoding a payload 305 portion of the first message. In some cases, the encoder 310 may be a low-density parity check (LDPC) encoder. After encoding the payload, the UE 115 may pass the encoded bits through a scrambling 315, which may scramble the encoded bits. In some cases, the UE 115 may initialize the scrambling 315 by an identification 320 (e.g., cell ID and/or preamble ID). For example, the identification 320 may include a modified radio network temporary identifier (RNTI) (e.g., $n_{RNTI}$). Additionally, the scrambling 315 may include a unified bit scrambling scheme for all RRC states of the UE 115 (e.g., connected, idle, inactive, etc.) based on Equation 1 as given below.

$$n_{RNTI} \triangleq \lfloor RA\text{-RNTI} + K_1 \times p_{id} + K_2 \times r_{id} \rfloor_{16} \quad (1)$$

where $p_{id}$ may represent an index of the preamble of the first message, $r_{id}$ may represent an index of a DMRS of the first message, and $K_1$ and $K_2$ may represent constants for signaling. Additionally, the scrambling 315 may include an initialization based on $n_{RNTI}$ as given below in Equation 2.

$$C_{init} = n_{RNTI} \times 2^{15} + n_{ID} \quad (2)$$

After scrambling the encoded bits, the UE 115 may then use a modulation 325. In some cases, the modulation 325 may include a linear modulation. Subsequently, the UE 115 may perform a precoding 330 (e.g., transform precoding) on the modulated bits. The UE 115 may then use an inverse fast Fourier transform (IFFT) 335 after precoding to transform the bits. After the IFFT 335, the UE 115 may use a multiplexer (MUX) 340. In some cases, with the MUX 340, the UE 115 may use a DMRS 345 to determine the multiplexing. As described herein, DMRS 345 may include a cell-specific scrambling and hopping sequence 350 as indicated by the base station 105 with the parameters for transmitting the first message and reducing the inter-cell interference. Additionally, the UE 115 may piggyback uplink control information 355 on the bits while using the MUX 340.

Subsequently, the UE 115 may perform a mapping 360. In some cases, the UE 115 may perform the mapping 360 as indicated in a preamble 365 of the first message. For example, the preamble 365 may indicate a pre-defined mapping rule between a preamble and the payload of the first message. Additionally, the preamble 365 may include a preamble sequence ID that can be used to identify the DMRS 345. In some cases, as described herein, mapping 360 may include a cell-specific configuration 370 as indicated by the base station 105 with the parameters for transmitting the first message and reducing the inter-cell interference. The UE 115 may then transmit the first message (e.g., MsgA 375) after performing the different steps.

Figure 4:
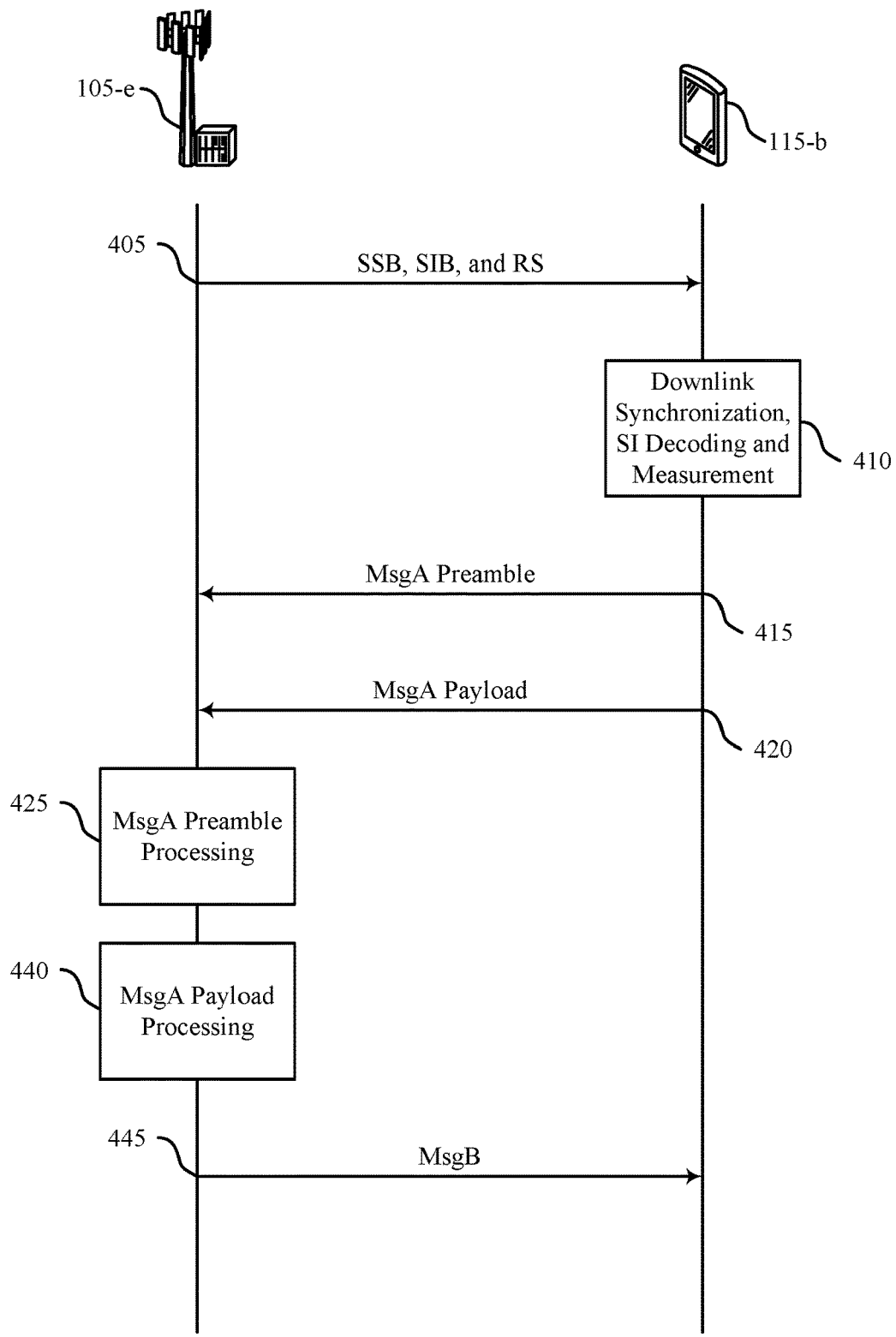
FIGS. 4 and 5 illustrate examples of process flows that support inter-cell coordination of RACH transmission in accordance with aspects of the present disclosure.

FIG. 4 illustrates an example of a process flow 400 that supports inter-cell coordination of RACH transmission in accordance with aspects of the present disclosure. In some examples, process flow 400 may implement aspects of wireless communications systems 100 and/or 200. Process flow 400 may include a base station 105-e and a UE 115-b, which may be examples of corresponding base stations 105 and UEs 115, respectively, as described above with reference to FIGS. 1-3. Additionally, process flow 400 may illustrate a two-step RACH procedure as described herein for UE 115-b to establish a connection with base station 105-e for subsequent communications.

At 405, base station 105-e may transmit a synchronization signal block (SSB), system information block (SIB), reference signal (RS), or a combination thereof to indicate configuration information to UE 115-b for performing the two-step RACH procedure. At 410, UE 115-b may perform a downlink synchronization based on the received SSB to synchronize with base station 105-e prior to beginning the two-step RACH procedure. Additionally, UE 115-b may decode and measure any system information transmissions received from base station 105-e (e.g., SIB, RS, etc.) to identify configuration information for transmitting a first message of the two-step RACH procedure. For example, by decoding and measuring the system information, UE 115-b may identify a periodicity for transmitting different portions of the first message.

At 415, UE 115-b may transmit, to base station 105-e, a preamble of the first message (e.g., MsgA preamble) of the two-step RACH procedure. As described herein, UE 115-b may transmit the preamble in one or more RACH occasions configured by base station 105-e to carry the preamble. Additionally, at 420, UE 115-b may transmit, to base station 105-e, a payload of the first message (e.g., MsgA payload), where the payload is transmitted in one or more PUSCH occasions associated with the RACH occasion as described herein.

At 425, base station 105-e may process the preamble of the first message. Accordingly, if the preamble is detected and intended for base station 105-e from UE 115-b, at 430, base station 105-e may then process the payload of the first message.

Based on correctly receiving and processing both portions of the first message, at 435, base station 105-e may then transmit a second message (e.g., MsgB) of the two-step RACH procedure to UE 115-b. Subsequently, if UE 115-b correctly receives the second message (e.g., with no interference or is able to decode the message with any interference), the two-step RACH procedure may be complete, and UE 115-b and base station 105-e may communicate based on the successful RACH procedure.

However, as described herein, inter-cell interference may occur between base station 105-e and nearby base stations 105 (e.g., adjacent base stations 105, neighboring base stations 105, etc.). For example, when transmitting the SSB, SIB, RS, or combination thereof to indicate the configuration information to respective UEs 115 for performing two-step RACH procedures, the base stations 105 may use a same configuration information for their respective UEs 115, which may result in collisions of MsgA transmissions from the different UEs 115. Accordingly, to mitigate inter-cell interference and balance RACH capacity for each base station 105, the base stations 105 may use an inter-cell coordination scheme for two-step RACH transmissions.

Figure 5:
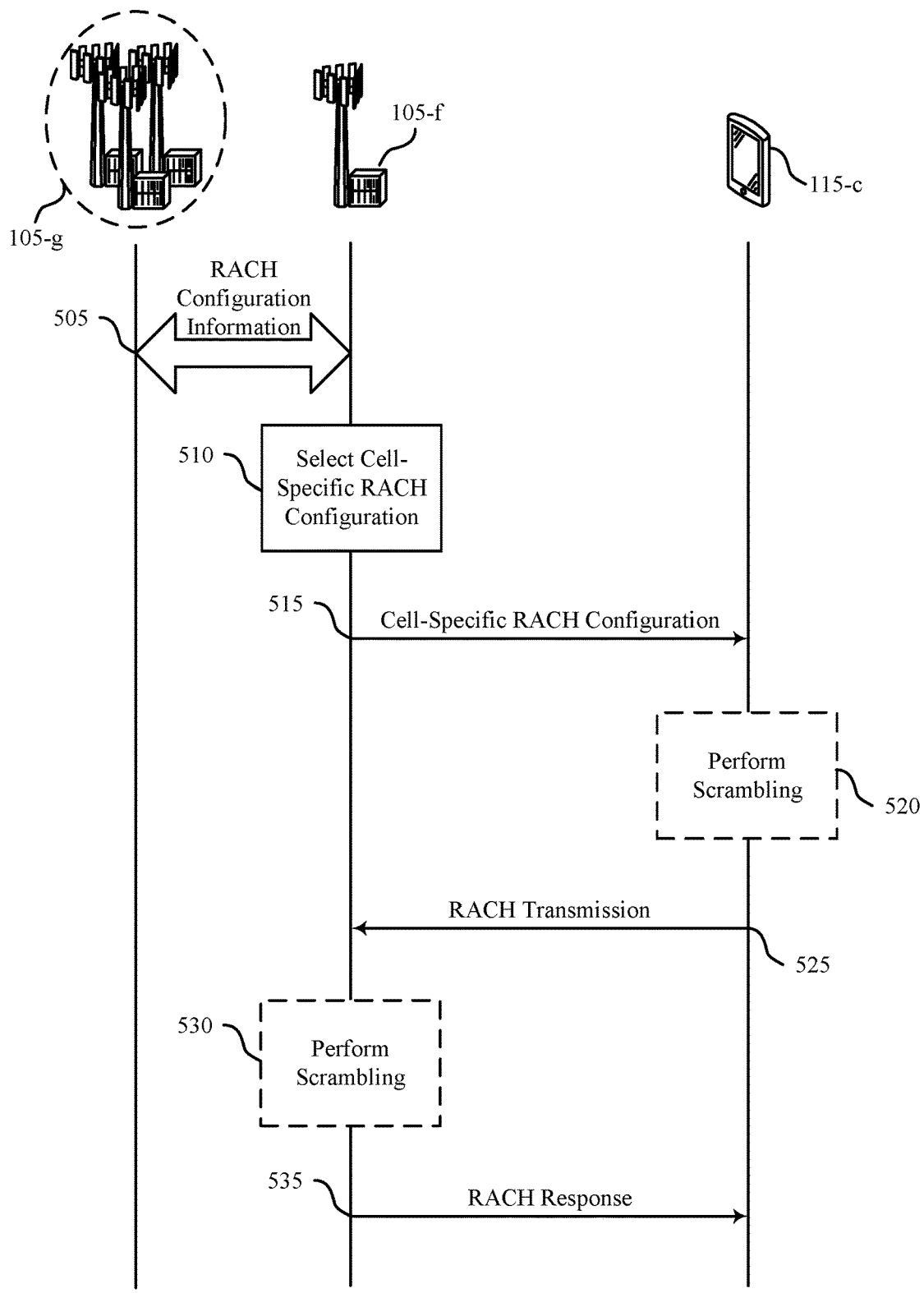

FIG. 5 illustrates an example of a process flow 500 that supports inter-cell coordination of RACH transmission in accordance with aspects of the present disclosure. In some examples, process flow 500 may implement aspects of wireless communications systems 100 and/or 200. Process flow 500 may include a base station 105-f and a UE 115-c, which may be examples of corresponding base stations 105 and UEs 115, respectively, as described above with reference to FIGS. 1-4. Additionally, process flow 500 may include a set of neighboring base stations 105-g that are nearby to base station 105-f.

In the following description of the process flow 500, the operations between UE 115-c and base station 105-f may be transmitted in a different order than the order shown, or the operations performed by base station 105-f and UE 115-c may be performed in different orders or at different times. Certain operations may also be left out of the process flow 500, or other operations may be added to the process flow 500. It is to be understood that while base station 105-f and UE 115-c are shown performing a number of the operations of process flow 500, any wireless device may perform the operations shown.

At 505, base station 105-f may exchange RACH configuration information with the neighboring base stations 105-g (e.g., at least a second base station 105). In some cases, the RACH configuration information may indicate a time allocation, a frequency allocation, or both, for a preamble of a first message transmission for a two-step RACH procedure. Additionally, base station 105-*f* may exchange the RACH configuration information via backhaul links with the neighboring base stations 105-*g*.

At 510, base station 105-*f* may select a cell-specific RACH configuration to mitigate inter-cell interference with the neighboring base stations 105-*g* based on the RACH configuration information exchanged at 505. In some cases, base station 105-*f* may select values for parameters that differ from values selected by the neighboring base stations 105-*g*. For example, the base station 105-*f* may select a preamble sequence and/or preamble transmission occasion that differs from a preamble sequence and/or preamble transmission occasion selected by any of the neighboring base stations 105-*g*. In another example, the base station 105-*f* may select a DMRS base sequence, antenna port mapping scheme, and/or DMRS transmission occasion that differs from a DMRS base sequence, antenna port mapping scheme, and/or DMRS transmission occasion selected by any of the neighboring base stations 105-*g*.

At 515, base station 105-*f* may transmit the cell-specific RACH configuration to UE 115-*c* (e.g., and any other UEs 115 served by base station 105-*f*). In some cases, transmitting the cell-specific RACH configuration may include transmitting a cell-specific resource configuration for a preamble and/or a cell-specific resource configuration for a payload.

At 520, UE 115-*c* may perform scrambling of a reference signal sequence to generate a scrambled reference signal sequence based on a preamble sequence identifier and a scrambling configuration indicated in the cell-specific RACH configuration.

At 525, base station 105-*f* may receive, from the UE, a RACH transmission (e.g., MsgA transmission of a two-step RACH) based on the cell-specific RACH configuration. In some cases, UE 115-*c* may transmit the RACH transmission that includes the scrambled reference signal sequence. As described above, if the cell-specific RACH configuration includes the cell-specific resource configuration for the preamble, the cell-specific resource configuration may indicate a first preamble sequence from a set of different preamble sequences, and base station 105-*f* may receive the RACH transmission that includes the preamble generated based on the first preamble sequence. Additionally or alternatively, if the cell-specific RACH configuration includes the cell-specific resource configuration for the preamble, the cell-specific resource configuration may indicate a first transmission occasion from a set of different transmission occasions, and base station 105-*f* may receive the RACH transmission within the first transmission occasion.

In some cases, if the cell-specific RACH configuration includes the cell-specific resource configuration for the payload, the cell-specific resource configuration may indicate a first base sequence from a set of different base sequences (e.g., DMRS base sequences), and base station 105-*f* may receive the RACH transmission that includes the payload generated based on the first base sequence. Additionally or alternatively, the cell-specific resource configuration may indicate a first antenna port mapping scheme from a set of different antenna port mapping schemes, and base station 105-*f* may receive the RACH transmission based on the first antenna port mapping scheme. In some cases, the cell-specific resource configuration may indicate a first transmission occasion from a set of different transmission occasions, and base station 105-*f* may receive the RACH transmission within the first transmission occasion.

Additionally or alternatively, the cell-specific RACH configuration may include an indication of a cell-specific muting pattern; a beam configuration that indicates a first transmission beam from a set of different transmission beams; a scrambling set extension of reference signal sequences (e.g., DMRS sequences); a hopping pattern of reference signal sequences across different symbols (e.g., DMRS symbols); an RB hopping pattern for a reference signal (e.g., DMRS), a shared data channel (e.g., PUSCH) transmission, or both; a power control configuration; a RACH type configuration; a transmit beam coordination configuration; signaling a cell identifier of base station 105-*f*; a preamble identifier, or both; or a combination thereof. In some cases, a UE 115-*c* may choose between a two-step RACH and a four-step RACH based on an interference level. For example, the UE may select the four-step RACH when an observed interference level does not satisfy a threshold (e.g., measured interference level exceeds a threshold) or may select a two-step RACH when the observed interference level satisfies a threshold (e.g., measured interference level meets or is below a threshold). In some cases, the cell-specific RACH configuration may indicate a transmit and/or receive beam being used by the base station 105-*f*, a transmit and/or receive beam to be used by the UE 115-*c* to mitigate inter-cell interference.

Accordingly, base station 105-*f* may receive the RACH transmission in accordance with the cell-specific muting pattern configuration, using a receive beam corresponding to the first transmission beam, based on the scrambling set extension of the reference signal sequences (e.g., where a payload of the RACH transmission is scrambled according to the scrambling set extension), based on the hopping pattern, based on the RB hopping pattern, based on the power control configuration, based on the RACH type configuration, based on the transmit beam coordination configuration, based on the cell identifier of base station 105-*f* and/or the preamble identifier (e.g., where the payload is scrambled based on the cell identifier, preamble identifier, or both), or a combination thereof.

At 530, base station 105-*f* may perform scrambling of a reference signal sequence to generate a scrambled reference signal sequence based on a preamble sequence identifier and a scrambling configuration indicated in the cell-specific RACH configuration. In some cases, base station 105-*f* may receive the RACH transmission that includes the scrambled reference signal sequence.

At 535, base station 105-*f* may transmit, to UE 115-*c*, a RACH response (e.g., MsgB transmission of a two-step RACH) based on the RACH transmission received at 525 to establish a connection, and base station 105-*f* and UE 115-*c* may subsequently communicate (e.g., transmit) using the established connection.

Figure 6:
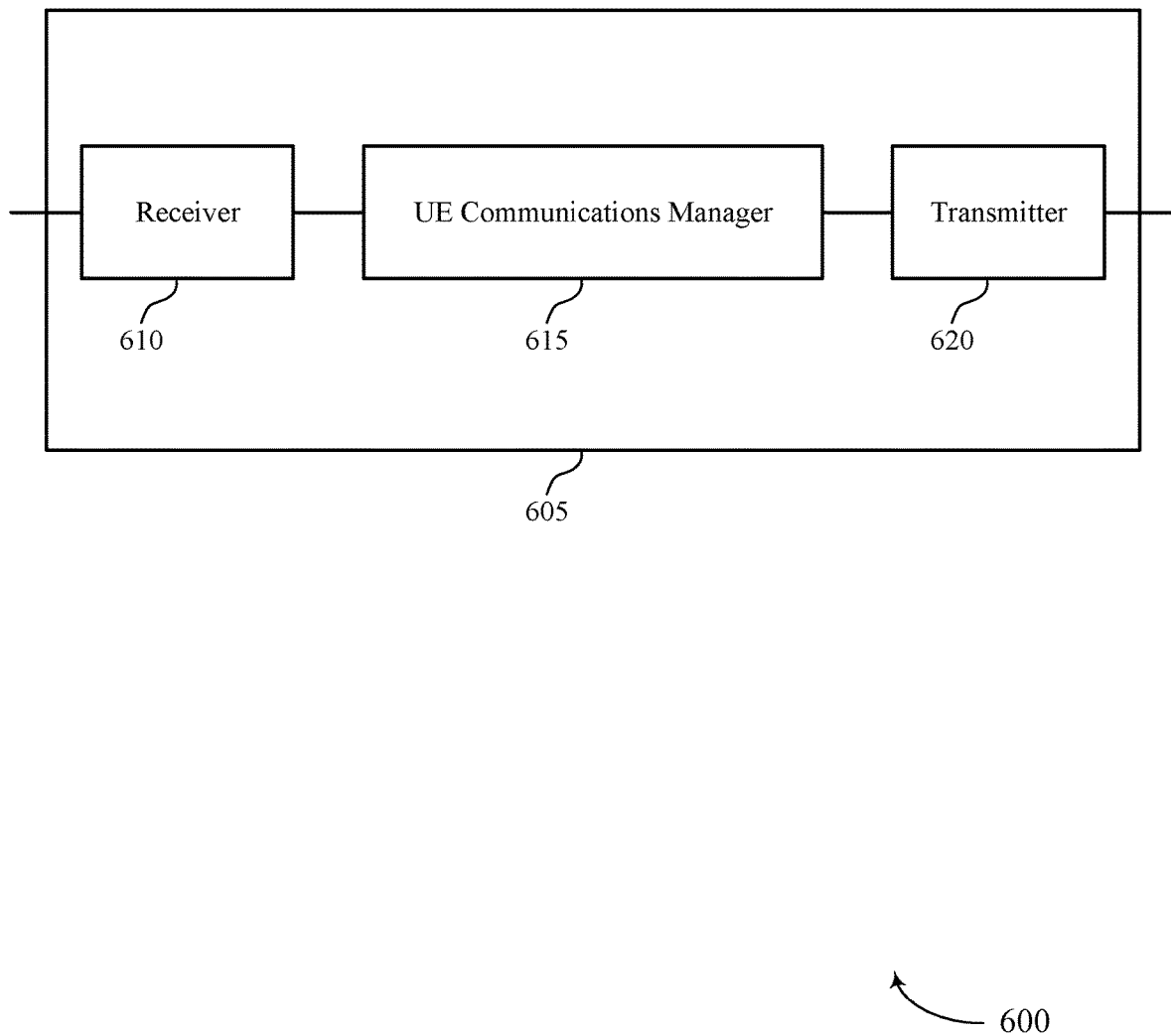
FIGS. 6 and 7 show diagrams of devices that support inter-cell coordination of RACH transmission in accordance with aspects of the present disclosure.

FIG. 6 shows a diagram 600 of a device 605 that supports inter-cell coordination of RACH transmission in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to inter-cell coordination of RACH transmission, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive, from a first base station, a cell-specific RACH configuration selected to mitigate inter-cell interference with a second base station. In some cases, the UE communications manager 615 may transmit a RACH transmission (e.g., a MsgA of a two-step RACH) based on the cell-specific RACH configuration. Additionally, the UE communications manager 615 may receive, from the first base station, a RACH response (e.g., a MsgB of the two-step RACH) based on the RACH transmission. The UE communications manager 615 may be an example of aspects of the UE communications manager 910 described herein.

Based on the actions performed by the UE communications manager 615 as described herein, a UE 115 may transmit a first message of a two-step RACH procedure with a reduced chance of causing an inter-cell interference, which may reduce additional signaling overhead of retransmissions if first transmissions are unsuccessfully received at a base station 105 due to the inter-cell interference. For example, based on the cell-specific RACH configuration, the UE 115 may use a configuration for transmitting the first message of the two-step RACH procedure that does not collide with other first messages from UEs 115 attempting to establishing connections with neighboring base stations 105.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
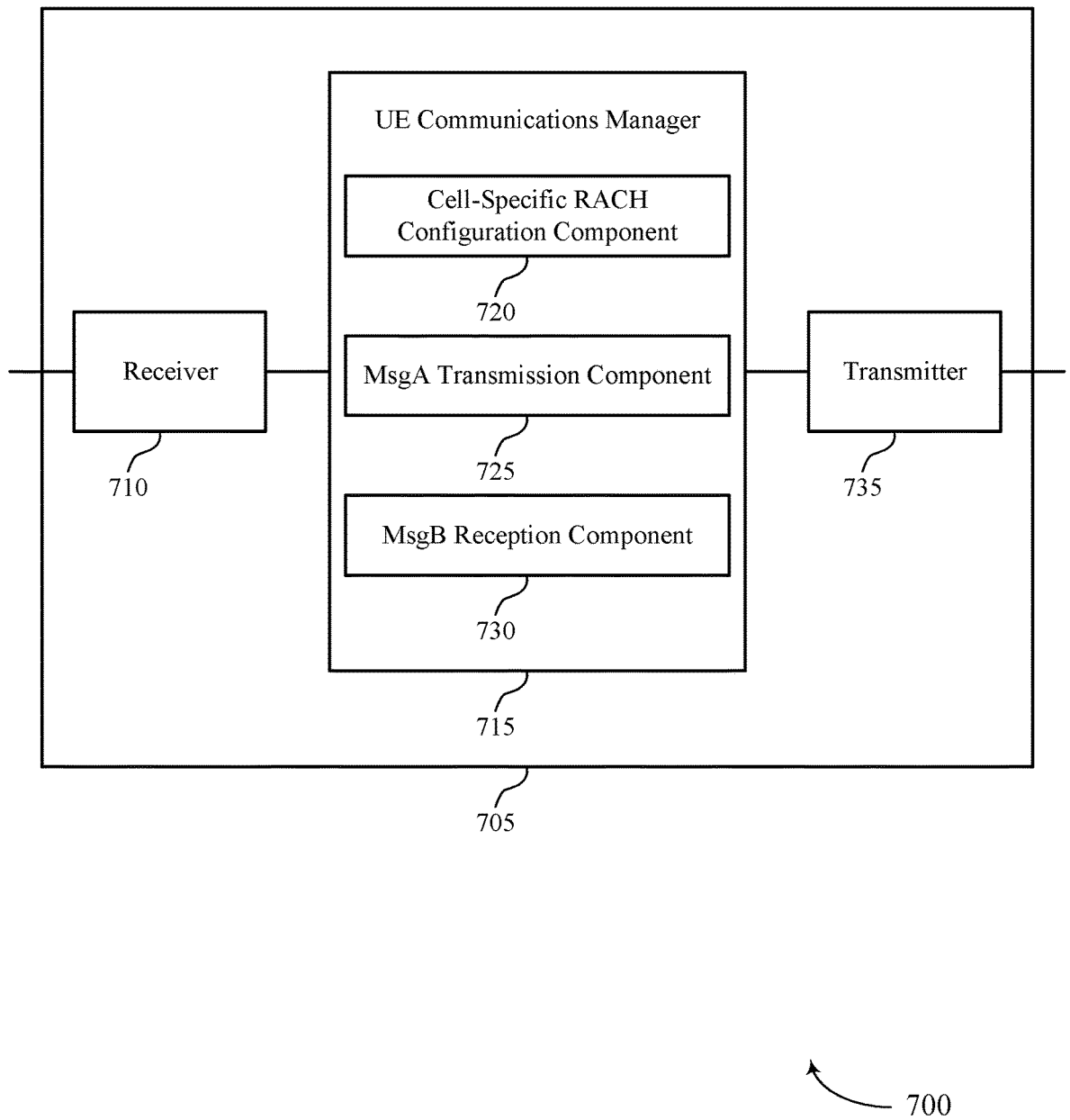

FIG. 7 shows a diagram 700 of a device 705 that supports inter-cell coordination of RACH transmission in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to inter-cell coordination of RACH transmission, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a cell-specific RACH configuration component 720, a MsgA transmission component 725, and a MsgB reception component 730. The UE communications manager 715 may be an example of aspects of the UE communications manager 910 described herein.

The cell-specific RACH configuration component 720 may receive, from a first base station, a cell-specific RACH configuration selected to mitigate inter-cell interference with a second base station.

The MsgA transmission component 725 may transmit a RACH transmission (e.g., a MsgA of a two-step RACH) based on the cell-specific RACH configuration.

The MsgB reception component 730 may receive, from the first base station, a RACH response (e.g., a MsgB of the two-step RACH) based on the RACH transmission.

Based on receiving the cell-specific RACH configuration, a processor of a UE 115 (e.g., controlling the receiver 710, the transmitter 740, or a transceiver 920 as described with reference to FIG. 9) may efficiently prepare a preamble and payload of a first message of a two-step RACH procedure with a base station 105 that does not interfere or collide with RACH transmissions for other base stations 105. For example, the processor of the UE 115 may identify parameters for transmitting the first message such that the first message has a higher chance of being received correctly at the base station 105. Accordingly, the processor may increase the reliability that the first message is transmitted successfully.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
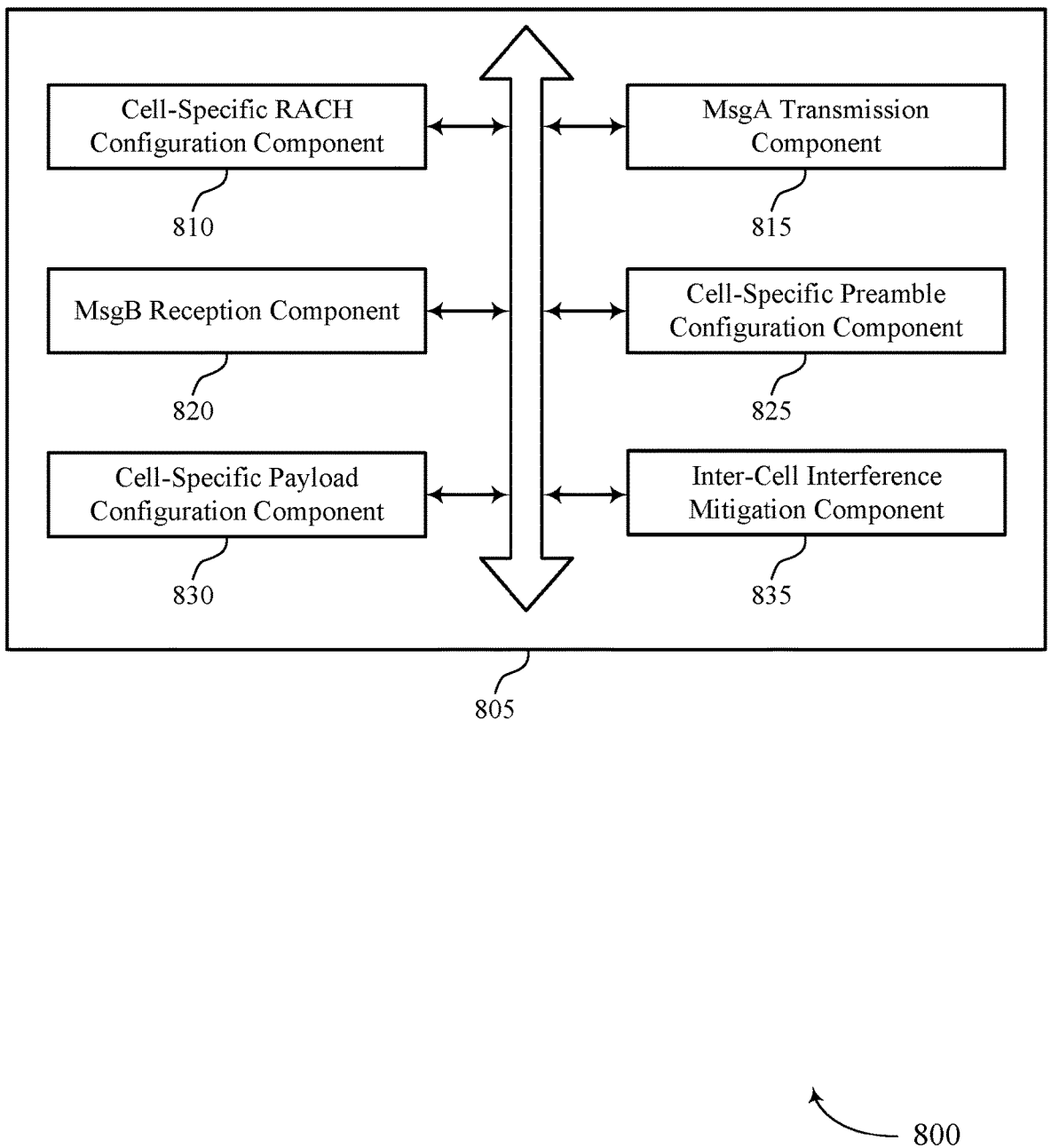
FIG. 8 shows a diagram of a UE communications manager that supports inter-cell coordination of RACH transmission in accordance with aspects of the present disclosure.

FIG. 8 shows a diagram 800 of a UE communications manager 805 that supports inter-cell coordination of RACH transmission in accordance with aspects of the present disclosure. The UE communications manager 805 may be an example of aspects of a UE communications manager 615, a UE communications manager 715, or a UE communications manager 910 described herein. The UE communications manager 805 may include a cell-specific RACH configuration component 810, a MsgA transmission component 815, a MsgB reception component 820, a cell-specific preamble configuration component 825, a cell-specific payload configuration component 830, and an inter-cell interference mitigation component 835. Each of these modules may communicate, directly or indirectly, with one another (e.g., via one or more buses).

The cell-specific RACH configuration component 810 may receive, from a first base station, a cell-specific RACH configuration selected to mitigate inter-cell interference with a second base station.

The MsgA transmission component 815 may transmit a RACH transmission based on the cell-specific RACH configuration.

The MsgB reception component 820 may receive, from the first base station, a RACH response based on the RACH transmission.

The cell-specific preamble configuration component 825 may receive a cell-specific resource configuration for a preamble. In some cases, the cell-specific resource configuration may indicate a first preamble sequence from a set of different preamble sequences, and the cell-specific preamble configuration component 825 may generate a preamble based on the first preamble sequence and transmit the RACH transmission that includes the preamble. Additionally or alternatively, the cell-specific resource configuration may indicate a first transmission occasion from a set of different transmission occasions, and the cell-specific preamble configuration component 825 may transmit the RACH transmission within the first transmission occasion.

The cell-specific payload configuration component 830 may receive a cell-specific resource configuration for a payload. In some cases, the cell-specific resource configuration may indicate a first base sequence from a set of different base sequences, and the cell-specific payload configuration component 830 may generate the payload based on the first base sequence and transmit the RACH transmission that includes the payload. Additionally or alternatively, the cell-specific resource configuration may indicate a first antenna port mapping scheme from a set of different antenna port mapping schemes, and the cell-specific payload configuration component 830 may transmit the RACH transmission based on the first antenna port mapping scheme. In some examples, the cell-specific resource configuration may indicate a first transmission occasion from a set of different transmission occasions, and the cell-specific payload configuration component 830 may transmit the RACH transmission within the first transmission occasion.

The inter-cell interference mitigation component 835 may receive the cell-specific RACH configuration that indicates a cell-specific muting pattern configuration, where transmitting the RACH transmission includes transmitting the RACH transmission in accordance with the cell-specific muting pattern configuration.

In some examples, the inter-cell interference mitigation component 835 may receive a beam configuration that indicates a first transmission beam from a set of different transmission beams, where transmitting the RACH transmission includes transmitting the RACH transmission using the first transmission beam. Additionally or alternatively, the inter-cell interference mitigation component 835 may receive the cell-specific RACH configuration that indicates a scrambling set extension of reference signal sequences, where transmitting the RACH transmission includes scrambling a payload to generate a scrambled payload based on the scrambling set extension of the reference signal sequences and transmitting the RACH transmission that includes the scrambled payload.

In some examples, the inter-cell interference mitigation component 835 may receive the cell-specific RACH configuration that indicates a hopping pattern of reference signal sequences across different symbols, where transmitting the RACH transmission includes transmitting the RACH transmission based on the hopping pattern. Additionally or alternatively, the inter-cell interference mitigation component 835 may receive the cell-specific RACH configuration that indicates an RB hopping pattern for a reference signal, a shared data channel transmission, or both, where transmitting the RACH transmission includes transmitting the RACH transmission based on the RB hopping pattern.

In some examples, the inter-cell interference mitigation component 835 may receive the cell-specific RACH configuration that indicates a power control configuration, where transmitting the RACH transmission includes transmitting the RACH transmission based on the power control configuration. Additionally or alternatively, the inter-cell interference mitigation component 835 receive the cell-specific RACH configuration that indicates a RACH type configuration, where transmitting the RACH transmission includes transmitting the RACH transmission based on the RACH type configuration.

In some examples, the inter-cell interference mitigation component 835 may receive the cell-specific RACH configuration that indicates a transmit beam coordination configuration, where transmitting the RACH transmission includes transmitting the RACH transmission based on the transmit beam coordination configuration. Additionally or alternatively, the inter-cell interference mitigation component 835 may perform bit scrambling of a payload to generate a scrambled payload based on a cell identifier of the first base station, a preamble identifier, or both, where transmitting the RACH transmission includes transmitting the RACH transmission that comprises the scrambled payload.

In some examples, the inter-cell interference mitigation component 835 may perform scrambling of a reference signal sequence to generate a scrambled reference signal sequence based on a preamble sequence identifier and a scrambling configuration indicated in the cell-specific RACH configuration, where transmitting the RACH transmission includes transmitting the RACH transmission that includes the scrambled reference signal sequence.

Figure 9:
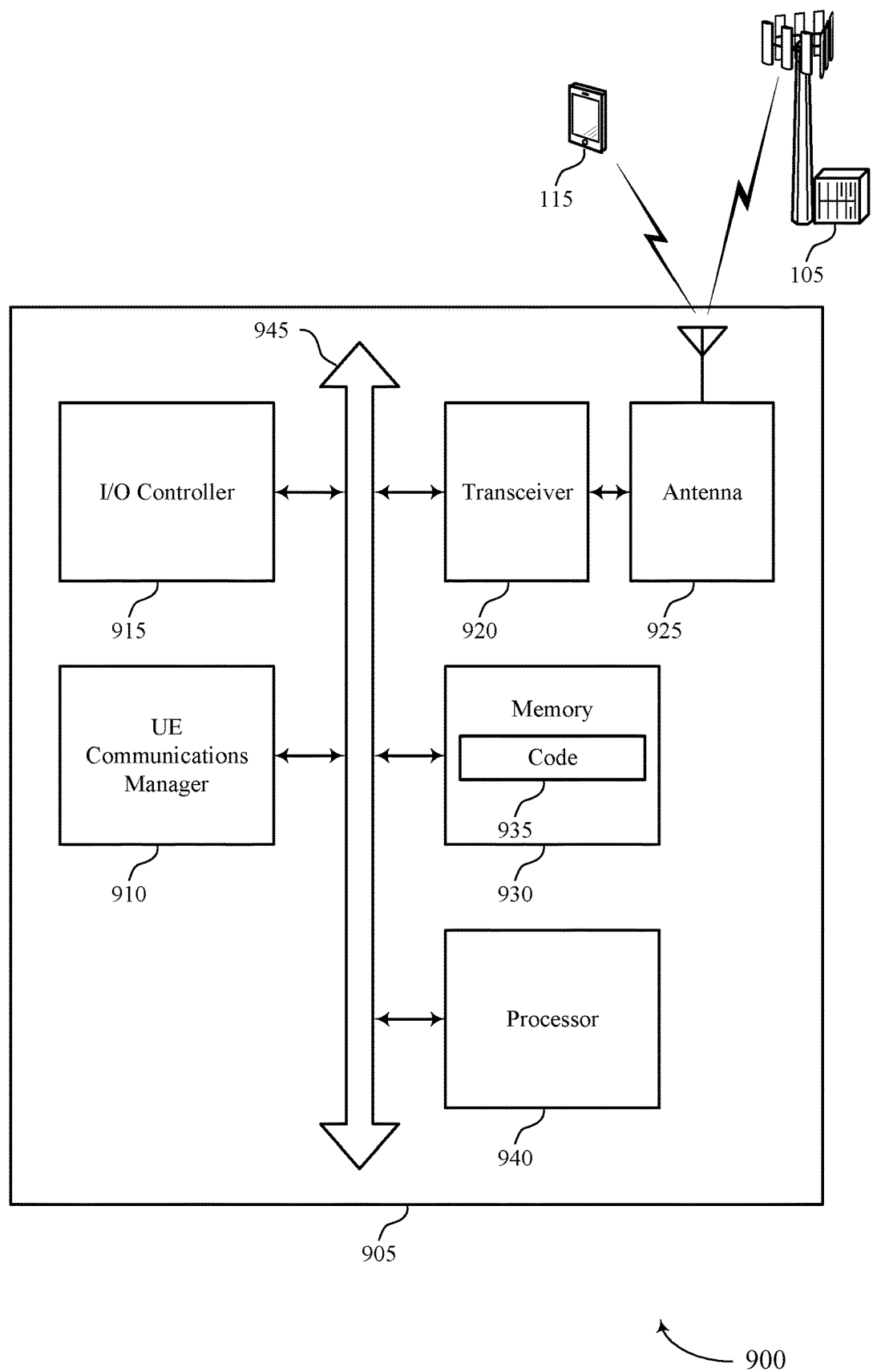
FIG. 9 shows a diagram of a system including a device that supports inter-cell coordination of RACH transmission in accordance with aspects of the present disclosure.

FIG. 9 shows a diagram of a system 900 including a device 905 that supports inter-cell coordination of RACH transmission in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive, from a first base station, a cell-specific RACH configuration selected to mitigate inter-cell interference with a second base station. In some cases, the UE communications manager 910 may transmit a RACH transmission based on the cell-specific RACH configuration. Additionally, the UE communications manager 910 may receive, from the first base station, a RACH response based on the RACH transmission.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting inter-cell coordination of RACH transmission).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
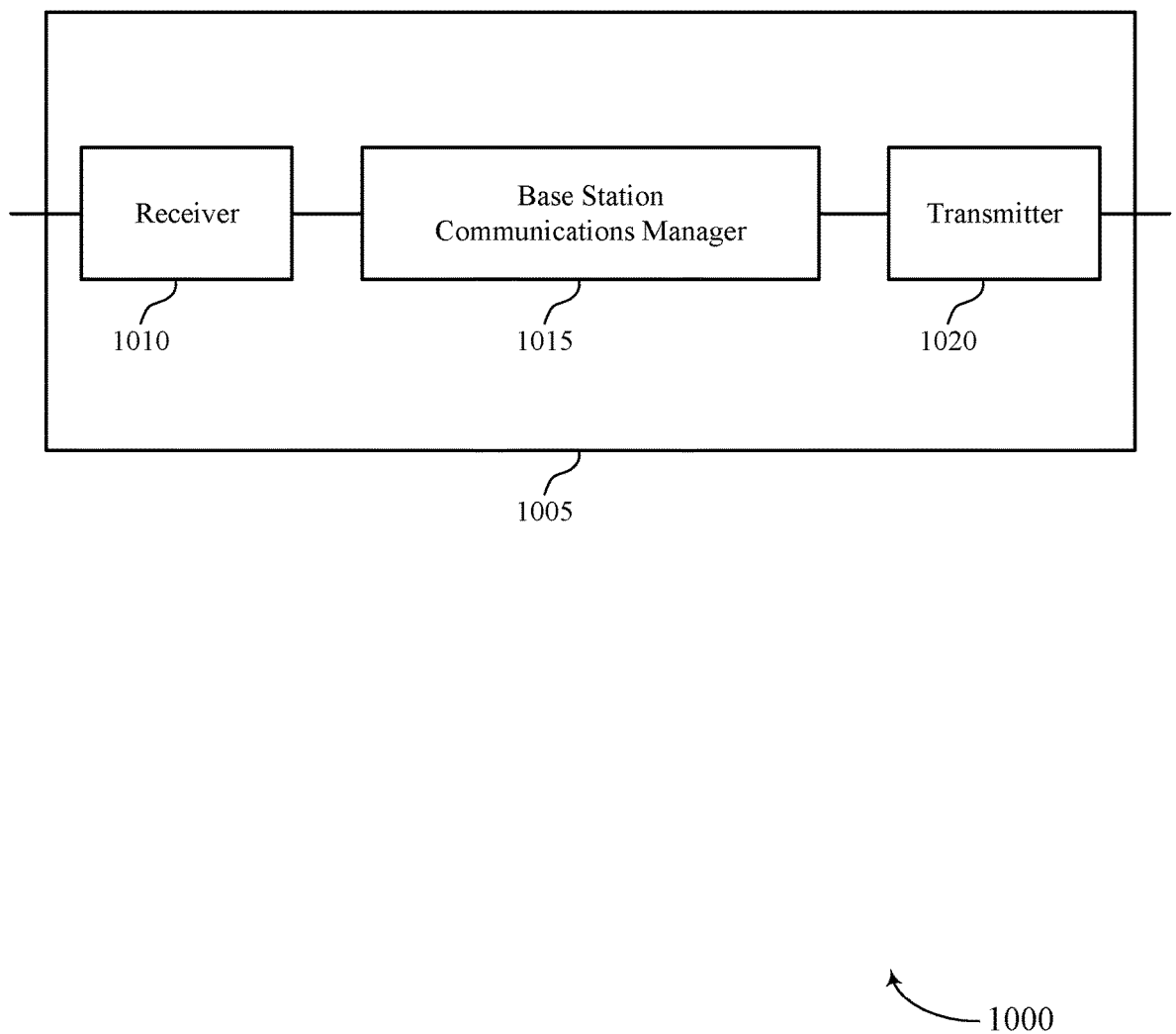
FIGS. 10 and 11 show diagrams of devices that support inter-cell coordination of RACH transmission in accordance with aspects of the present disclosure.

FIG. 10 shows a diagram 1000 of a device 1005 that supports inter-cell coordination of RACH transmission in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to inter-cell coordination of RACH transmission, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may exchange RACH configuration information with a second base station. In some cases, the base station communications manager 1015 may select a cell-specific RACH configuration to mitigate inter-cell interference with the second base station based on the RACH configuration information. Additionally, the base station communications manager 1015 may transmit the cell-specific RACH configuration to a UE served by the first base station. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
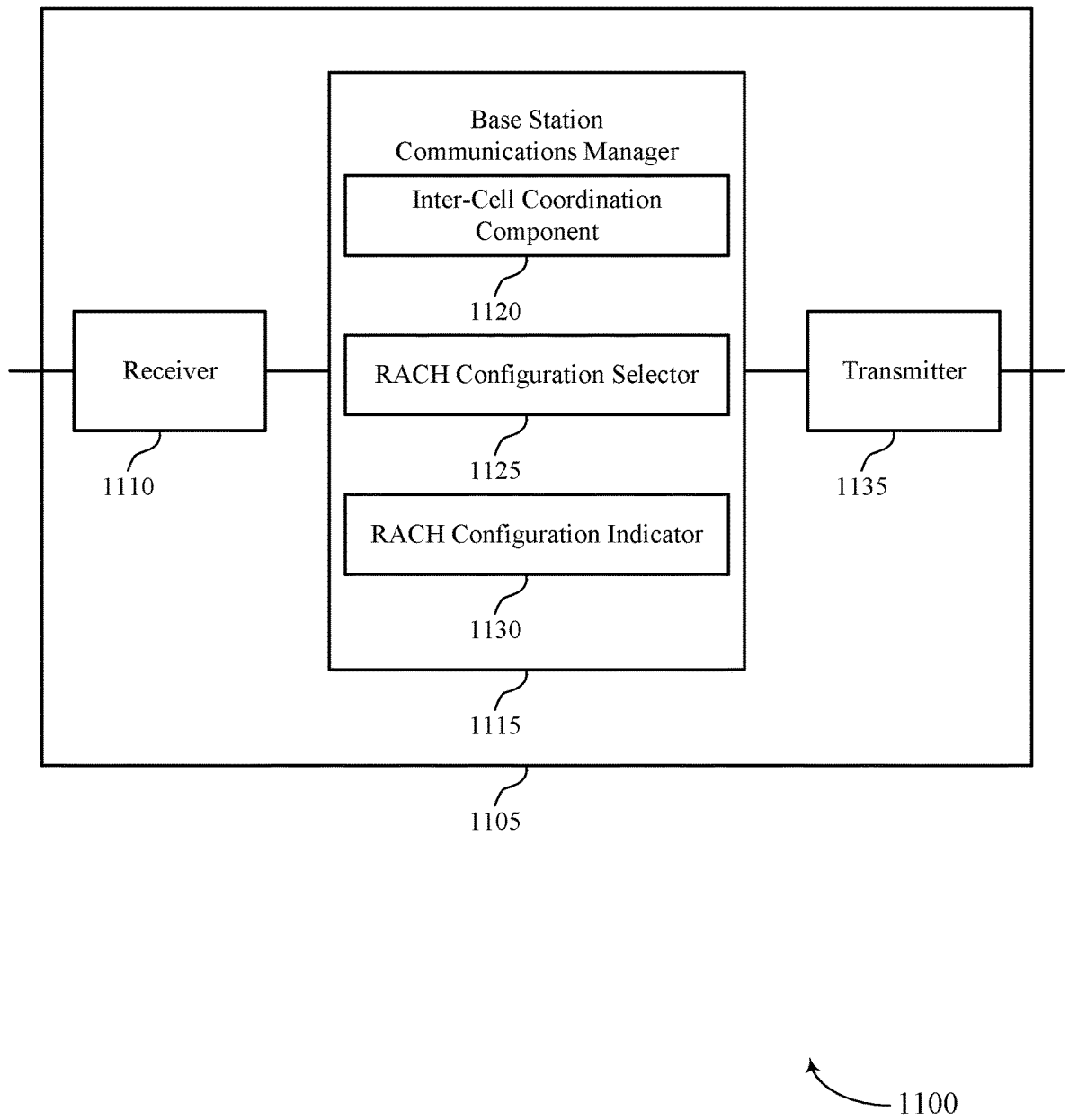

FIG. 11 shows a diagram 1100 of a device 1105 that supports inter-cell coordination of RACH transmission in accordance with aspects of the present disclosure. The device 1105 may be an example of aspects of a device 1005, or a base station 105 as described herein. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to inter-cell coordination of RACH transmission, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include an inter-cell coordination component 1120, a RACH configuration selector 1125, and a RACH configuration indicator 1130. The base station communications manager 1115 may be an example of aspects of the base station communications manager 1310 described herein.

The inter-cell coordination component 1120 may exchange RACH configuration information with a second base station.

The RACH configuration selector 1125 may select a cell-specific RACH configuration to mitigate inter-cell interference with the second base station based on the RACH configuration information.

The RACH configuration indicator 1130 may transmit the cell-specific RACH configuration to a UE served by the first base station.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
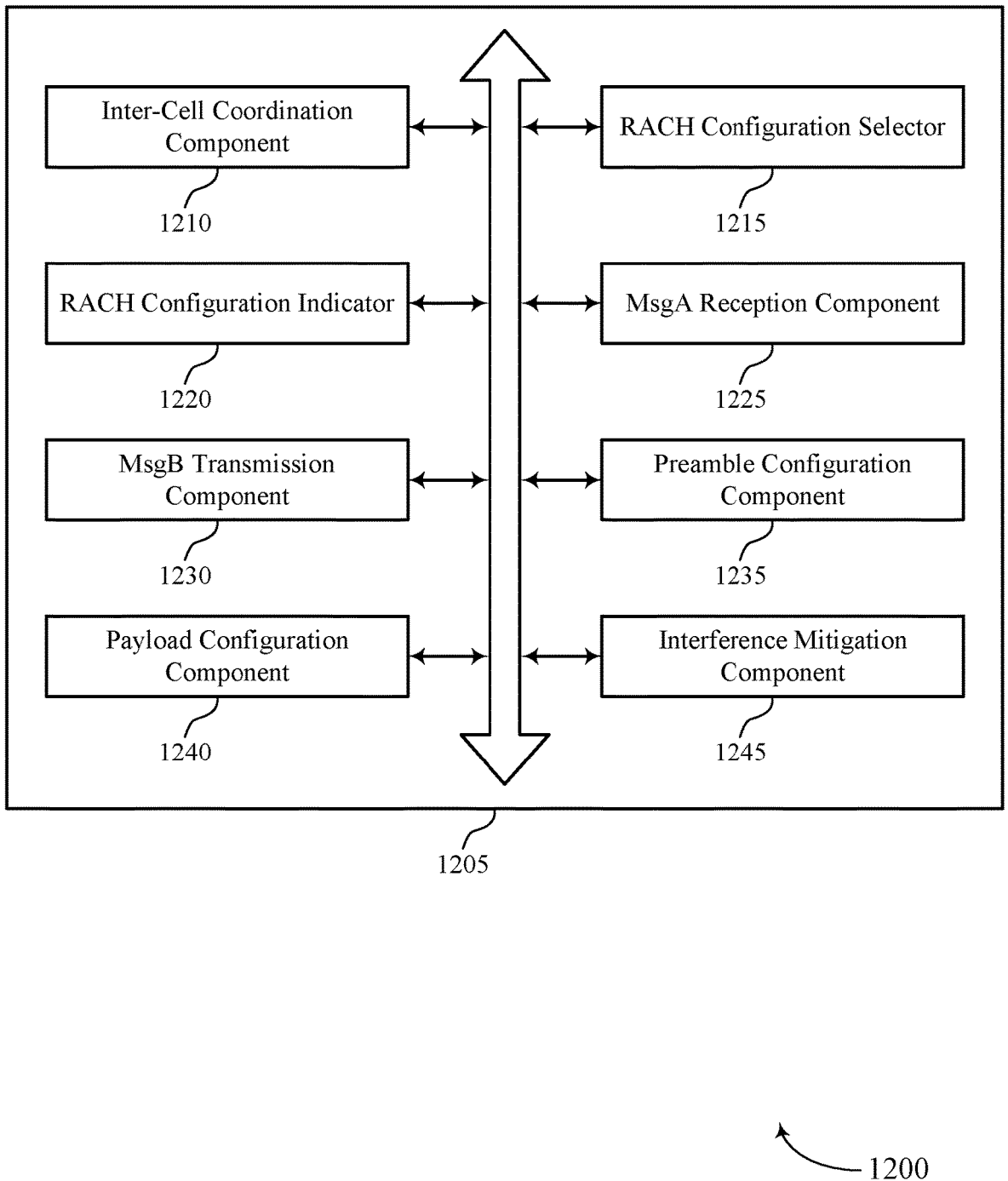
FIG. 12 shows a diagram of a base station communications manager that supports inter-cell coordination of RACH transmission in accordance with aspects of the present disclosure.

FIG. 12 shows a diagram 1200 of a base station communications manager 1205 that supports inter-cell coordination of RACH transmission in accordance with aspects of the present disclosure. The base station communications manager 1205 may be an example of aspects of a base station communications manager 1015, a base station communications manager 1115, or a base station communications manager 1310 described herein. The base station communications manager 1205 may include an inter-cell coordination component 1210, a RACH configuration selector 1215, a RACH configuration indicator 1220, a MsgA reception component 1225, a MsgB transmission component 1230, a preamble configuration component 1235, a payload configuration component 1240, and an interference mitigation component 1245. Each of these modules may communicate, directly or indirectly, with one another (e.g., via one or more buses).

The inter-cell coordination component 1210 may exchange RACH configuration information with a second base station.

The RACH configuration selector 1215 may select a cell-specific RACH configuration to mitigate inter-cell interference with the second base station based on the RACH configuration information.

The RACH configuration indicator 1220 may transmit the cell-specific RACH configuration to a UE served by the first base station. In some cases, the RACH configuration information indicates a time allocation, a frequency allocation, or both, for a preamble.

The MsgA reception component 1225 may receive, from the UE, a RACH transmission based on the cell-specific RACH configuration.

The MsgB transmission component 1230 may transmit, to the UE, a RACH response based on the RACH transmission.

The preamble configuration component 1235 may transmit a cell-specific resource configuration for a preamble. In some examples, the cell-specific resource configuration may indicate a first preamble sequence from a set of different preamble sequences, and the preamble configuration component 1235 may receive the RACH transmission that includes the preamble generated based on the first preamble sequence. Additionally or alternatively, the cell-specific resource configuration may indicate a first transmission occasion from a set of different transmission occasions, and the preamble configuration component 1235 may receive the RACH transmission within the first transmission occasion.

The payload configuration component 1240 may transmit a cell-specific resource configuration for a payload. In some examples, the cell-specific resource configuration may indicate a first base sequence from a set of different base sequences, and the payload configuration component 1240 may receive the RACH transmission that includes the payload generated based on the first base sequence. Additionally or alternatively, the cell-specific resource configuration may indicate a first antenna port mapping scheme from a set of different antenna port mapping schemes, and the payload configuration component 1240 may receive the RACH transmission based on the first antenna port mapping scheme. In some examples, the cell-specific resource configuration may indicate a first transmission occasion from a set of different transmission occasions, and the payload configuration component 1240 may receive the RACH transmission within the first transmission occasion.

The interference mitigation component 1245 may transmit the cell-specific RACH configuration that indicates a cell-specific muting pattern configuration, where receiving the RACH transmission includes receiving the RACH transmission in accordance with the cell-specific muting pattern configuration. In some examples, the interference mitigation component 1245 may transmit a beam configuration that indicates a first transmission beam from a set of different transmission beams, where receiving the RACH transmission includes receiving the RACH transmission using a receive beam corresponding to the first transmission beam.

In some examples, the interference mitigation component 1245 may transmit the cell-specific RACH configuration that indicates a scrambling set extension of reference signal sequences, where receiving the RACH transmission includes receiving the RACH transmission that comprises a payload scrambled based on the scrambling set extension of the reference signal sequences. Additionally or alternatively, the interference mitigation component 1245 may transmit the cell-specific RACH configuration that indicates a hopping pattern of reference signal sequences across different symbols, where receiving the RACH transmission includes receiving the RACH transmission based on the hopping pattern.

In some examples, the interference mitigation component 1245 may transmit the cell-specific RACH configuration that indicates an RB hopping pattern for a reference signal, a shared data channel transmission, or both, where receiving the RACH transmission includes receiving the RACH transmission based on the RB hopping pattern. Additionally or alternatively, the interference mitigation component 1245 may transmit the cell-specific RACH configuration that indicates a power control configuration, where receiving the RACH transmission includes receiving the RACH transmission based on the power control configuration.

In some examples, the interference mitigation component 1245 may transmit the cell-specific RACH configuration that indicates a RACH type configuration, where receiving the RACH transmission includes receiving the RACH transmission based on the RACH type configuration. Additionally or alternatively, the interference mitigation component 1245 may transmit the cell-specific RACH configuration that indicates a transmit beam coordination configuration, where receiving the RACH transmission includes receiving the RACH transmission based on the transmit beam coordination configuration.

In some examples, the interference mitigation component 1245 may signal a cell identifier of the first base station, a preamble identifier, or both, where receiving the RACH transmission includes receiving the RACH transmission that includes a payload scrambled based on the cell identifier of the first base station, the preamble identifier, or both. Additionally or alternatively, the interference mitigation component 1245 may perform scrambling of a reference signal sequence to generate a scrambled reference signal sequence based on a preamble sequence identifier and a scrambling configuration indicated in the cell-specific RACH configuration, where receiving the RACH transmission includes receiving the RACH response that comprises the scrambled reference signal sequence.

Figure 13:
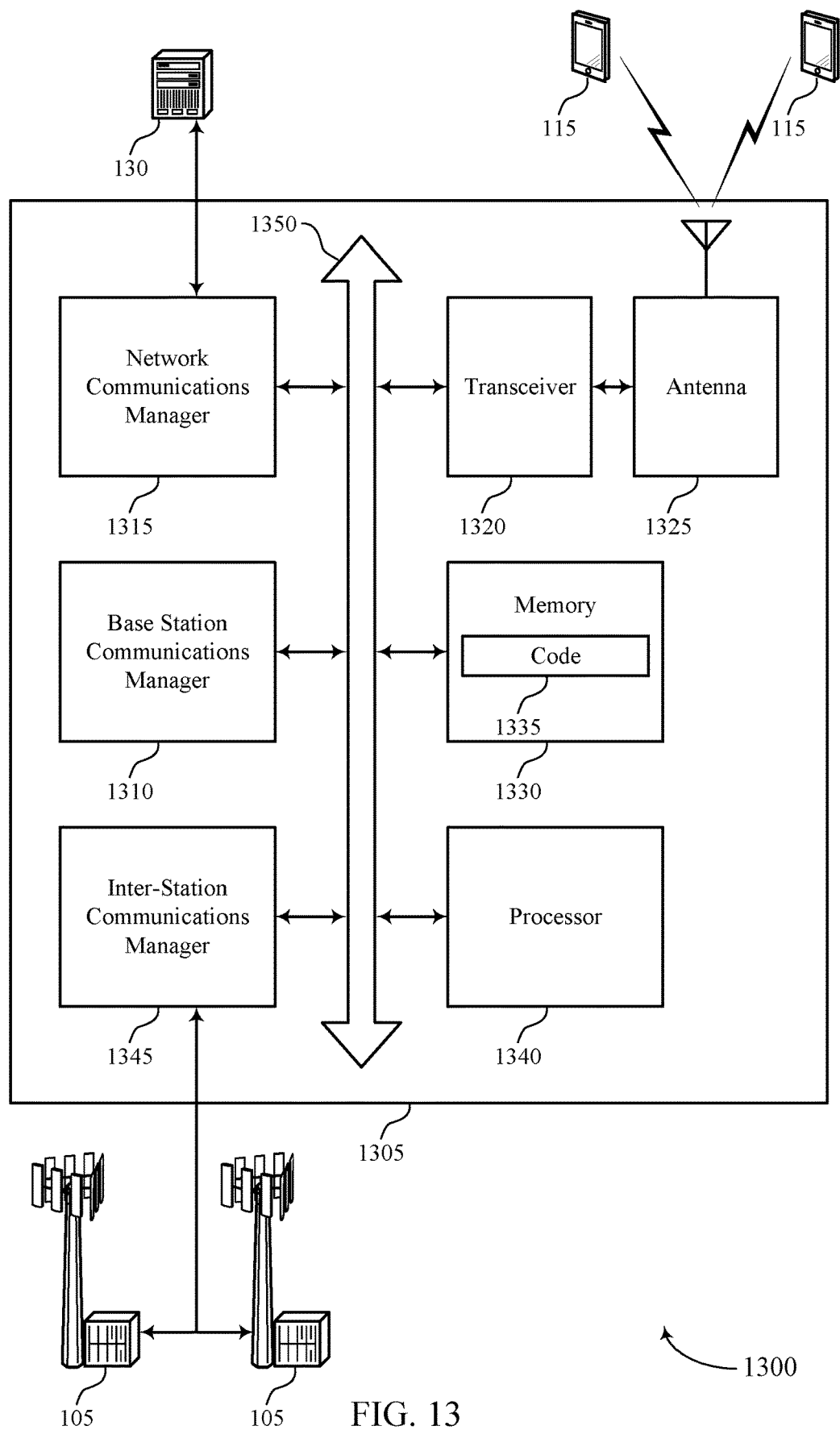
FIG. 13 shows a diagram of a system including a device that supports inter-cell coordination of RACH transmission in accordance with aspects of the present disclosure.

FIG. 13 shows a diagram of a system 1300 including a device 1305 that supports inter-cell coordination of RACH transmission in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may exchange RACH configuration information with a second base station. In some cases, the base station communications manager 1310 may select a cell-specific RACH configuration to mitigate inter-cell interference with the second base station based on the RACH configuration information. Additionally, the base station communications manager 1310 may transmit the cell-specific RACH configuration to a UE served by the first base station.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting inter-cell coordination of RACH transmission).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
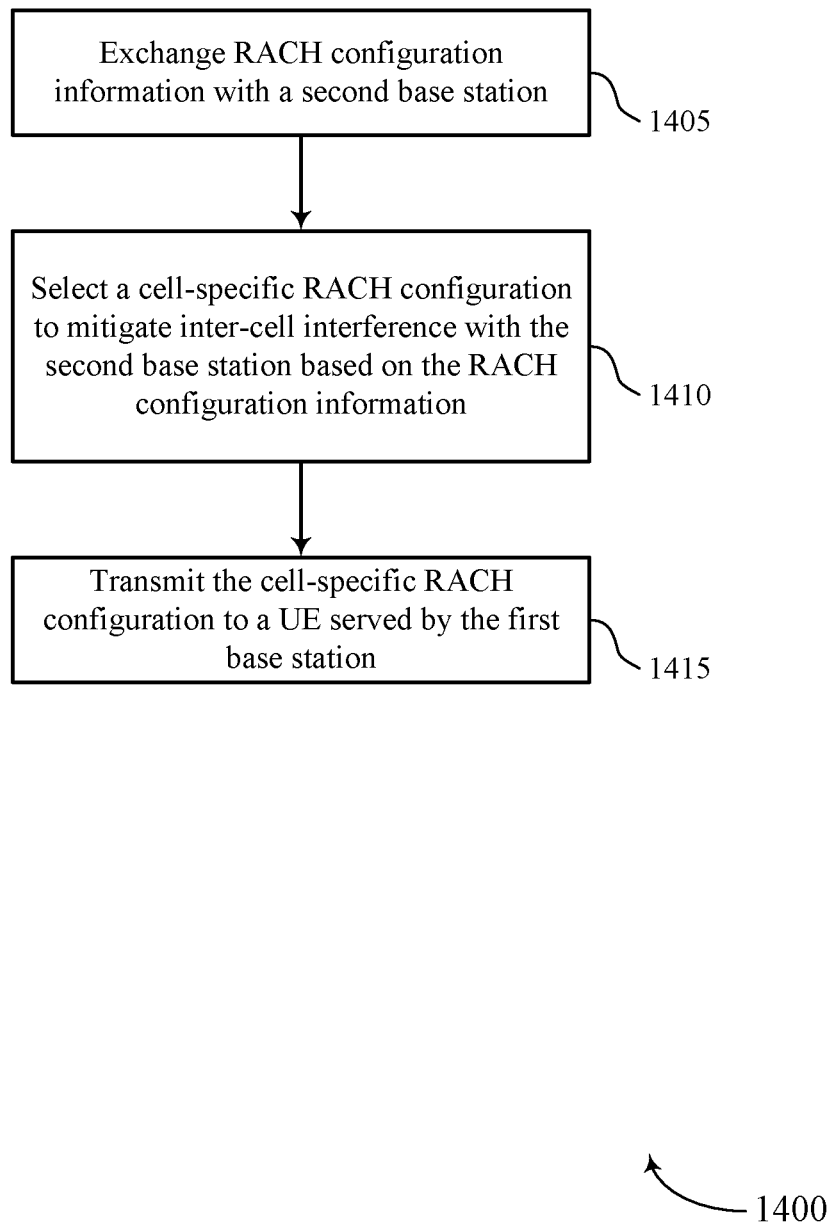
FIGS. 14 through 18 show flowcharts illustrating methods that support inter-cell coordination of RACH transmission in accordance with aspects of the present disclosure.

FIG. 14 shows a flowchart illustrating a method 1400 that supports inter-cell coordination of RACH transmission in accordance with aspects of the present disclosure. The operations of method 1400 may be implemented by a base station 105 or its components as described herein. For example, the operations of method 1400 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may exchange RACH configuration information with a second base station. The operations of 1405 may be performed according to the methods described herein. In some examples, aspects of the operations of 1405 may be performed by an inter-cell coordination component as described with reference to FIGS. 10 through 13.

At 1410, the base station may select a cell-specific RACH configuration to mitigate inter-cell interference with the second base station based on the RACH configuration information. The operations of 1410 may be performed according to the methods described herein. In some examples, aspects of the operations of 1410 may be performed by a RACH configuration selector as described with reference to FIGS. 10 through 13.

At 1415, the base station may transmit the cell-specific RACH configuration to a UE served by the first base station. The operations of 1415 may be performed according to the methods described herein. In some examples, aspects of the operations of 1415 may be performed by a RACH configuration indicator as described with reference to FIGS. 10 through 13.

Figure 15:
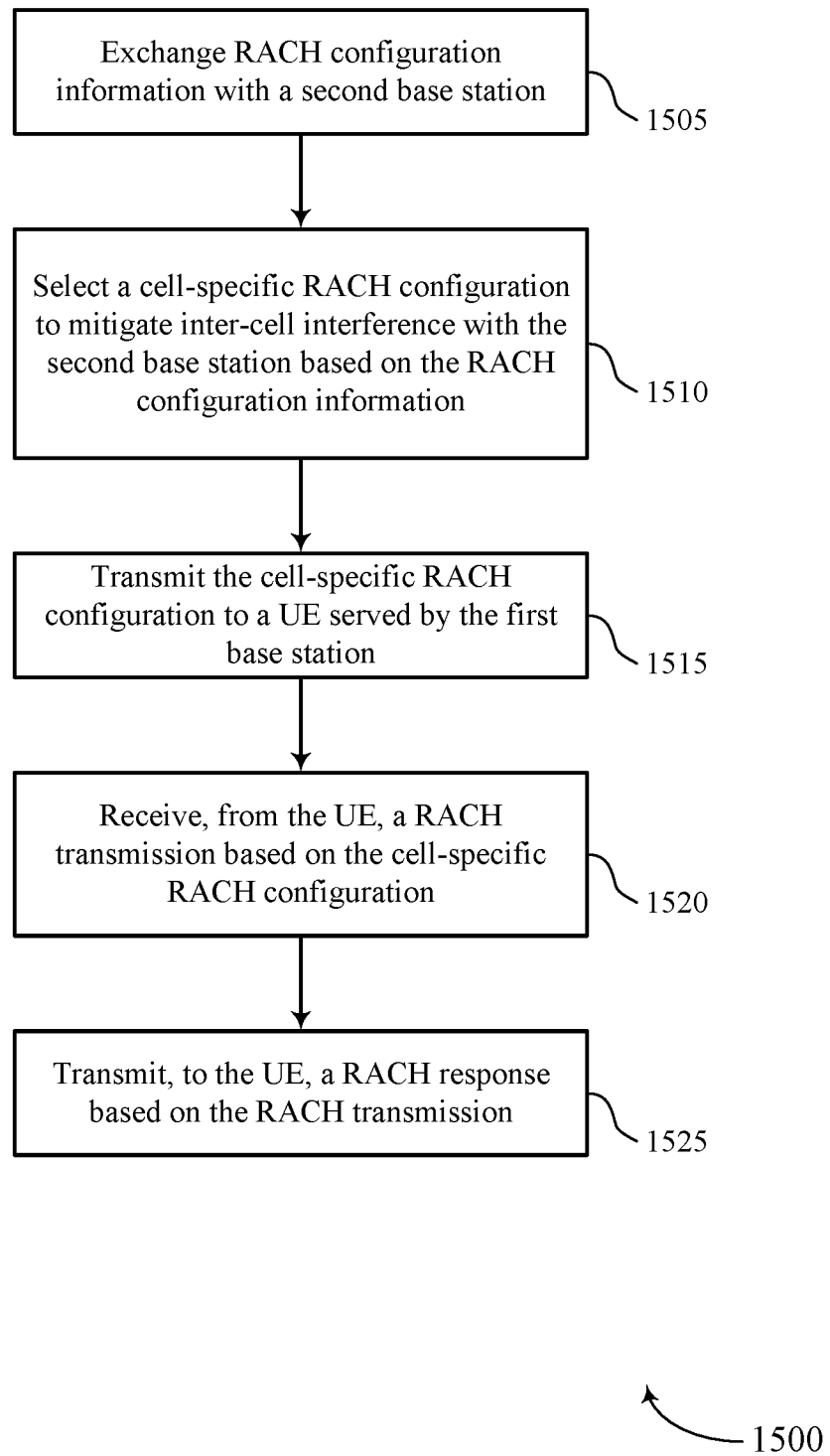

FIG. 15 shows a flowchart illustrating a method 1500 that supports inter-cell coordination of RACH transmission in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may exchange RACH configuration information with a second base station. The operations of 1505 may be performed according to the methods described herein. In some examples, aspects of the operations of 1505 may be performed by an inter-cell coordination component as described with reference to FIGS. 10 through 13.

At 1510, the base station may select a cell-specific RACH configuration to mitigate inter-cell interference with the second base station based on the RACH configuration information. The operations of 1510 may be performed according to the methods described herein. In some examples, aspects of the operations of 1510 may be performed by a RACH configuration selector as described with reference to FIGS. 10 through 13.

At 1515, the base station may transmit the cell-specific RACH configuration to a UE served by the first base station. The operations of 1515 may be performed according to the methods described herein. In some examples, aspects of the operations of 1515 may be performed by a RACH configuration indicator as described with reference to FIGS. 10 through 13.

At 1520, the base station may receive, from the UE, a RACH transmission based on the cell-specific RACH configuration. The operations of 1520 may be performed according to the methods described herein. In some examples, aspects of the operations of 1520 may be performed by a MsgA reception component as described with reference to FIGS. 10 through 13.

At 1525, the base station may transmit, to the UE, a RACH response based on the RACH transmission. The operations of 1525 may be performed according to the methods described herein. In some examples, aspects of the operations of 1525 may be performed by a MsgB transmission component as described with reference to FIGS. 10 through 13.

Figure 16:
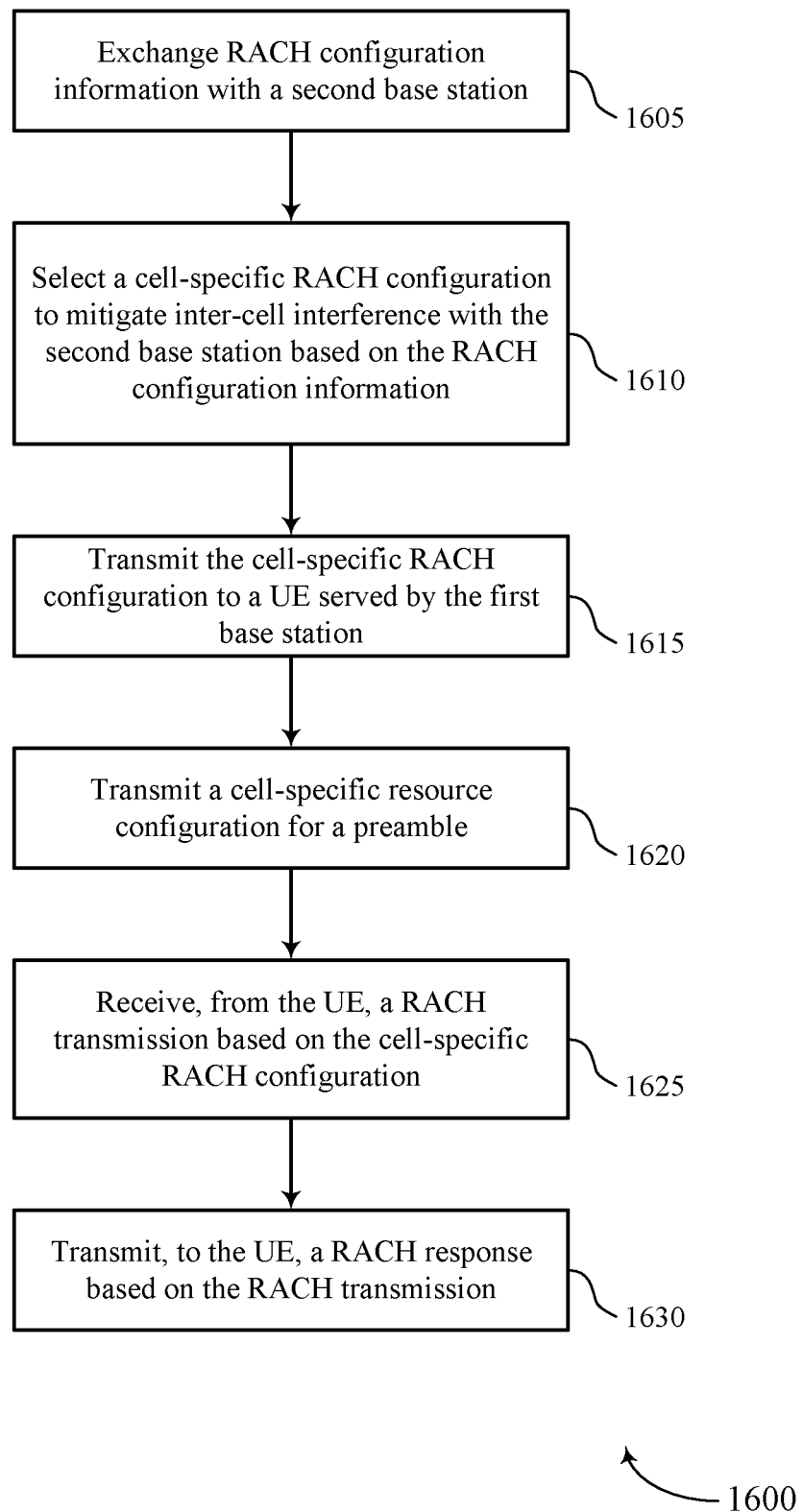

FIG. 16 shows a flowchart illustrating a method 1600 that supports inter-cell coordination of RACH transmission in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may exchange RACH configuration information with a second base station. The operations of 1605 may be performed according to the methods described herein. In some examples, aspects of the operations of 1605 may be performed by an inter-cell coordination component as described with reference to FIGS. 10 through 13.

At 1610, the base station may select a cell-specific RACH configuration to mitigate inter-cell interference with the second base station based on the RACH configuration information. The operations of 1610 may be performed according to the methods described herein. In some examples, aspects of the operations of 1610 may be performed by a RACH configuration selector as described with reference to FIGS. 10 through 13.

At 1615, the base station may transmit the cell-specific RACH configuration to a UE served by the first base station. The operations of 1615 may be performed according to the methods described herein. In some examples, aspects of the operations of 1615 may be performed by a RACH configuration indicator as described with reference to FIGS. 10 through 13.

At 1620, the base station may transmit a cell-specific resource configuration for a preamble. The operations of 1620 may be performed according to the methods described herein. In some examples, aspects of the operations of 1620 may be performed by a preamble configuration component as described with reference to FIGS. 10 through 13.

At 1625, the base station may receive, from the UE, a RACH transmission based on the cell-specific RACH configuration. The operations of 1625 may be performed according to the methods described herein. In some examples, aspects of the operations of 1625 may be performed by a MsgA reception component as described with reference to FIGS. 10 through 13.

At 1630, the base station may transmit, to the UE, a RACH response based on the RACH transmission. The operations of 1630 may be performed according to the methods described herein. In some examples, aspects of the operations of 1630 may be performed by a MsgB transmission component as described with reference to FIGS. 10 through 13.

Figure 17:
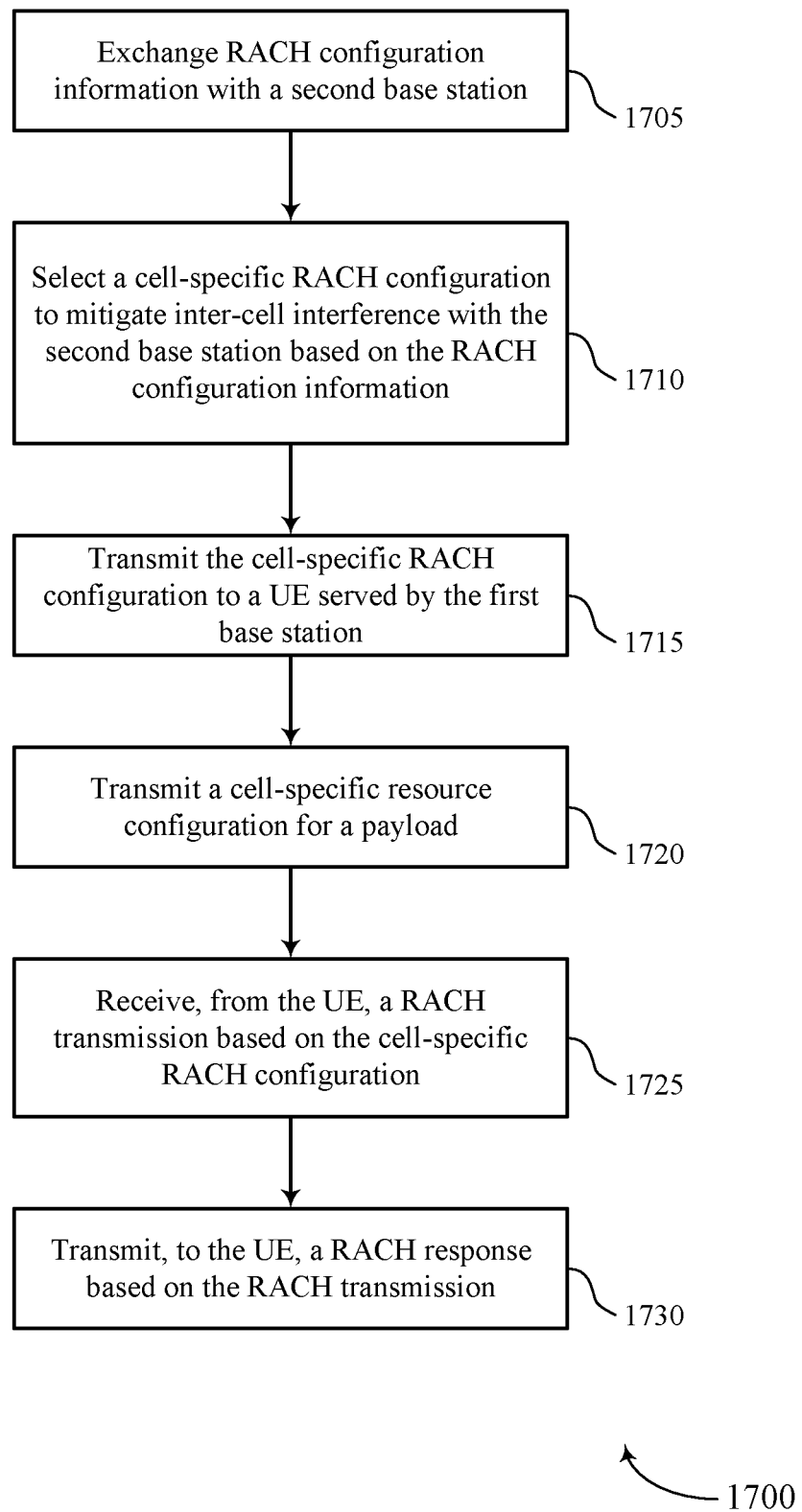

FIG. 17 shows a flowchart illustrating a method 1700 that supports inter-cell coordination of RACH transmission in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may exchange RACH configuration information with a second base station. The operations of 1705 may be performed according to the methods described herein. In some examples, aspects of the operations of 1705 may be performed by an inter-cell coordination component as described with reference to FIGS. 10 through 13.

At 1710, the base station may select a cell-specific RACH configuration to mitigate inter-cell interference with the second base station based on the RACH configuration information. The operations of 1710 may be performed according to the methods described herein. In some examples, aspects of the operations of 1710 may be performed by a RACH configuration selector as described with reference to FIGS. 10 through 13.

At 1715, the base station may transmit the cell-specific RACH configuration to a UE served by the first base station. The operations of 1715 may be performed according to the methods described herein. In some examples, aspects of the operations of 1715 may be performed by a RACH configuration indicator as described with reference to FIGS. 10 through 13.

At 1720, the base station may transmit a cell-specific resource configuration for a payload. The operations of 1720 may be performed according to the methods described herein. In some examples, aspects of the operations of 1720 may be performed by a payload configuration component as described with reference to FIGS. 10 through 13.

At 1725, the base station may receive, from the UE, a RACH transmission based on the cell-specific RACH configuration. The operations of 1725 may be performed according to the methods described herein. In some examples, aspects of the operations of 1725 may be performed by a MsgA reception component as described with reference to FIGS. 10 through 13.

At 1730, the base station may transmit, to the UE, a RACH response based on the RACH transmission. The operations of 1730 may be performed according to the methods described herein. In some examples, aspects of the operations of 1730 may be performed by a MsgB transmission component as described with reference to FIGS. 10 through 13.

Figure 18:
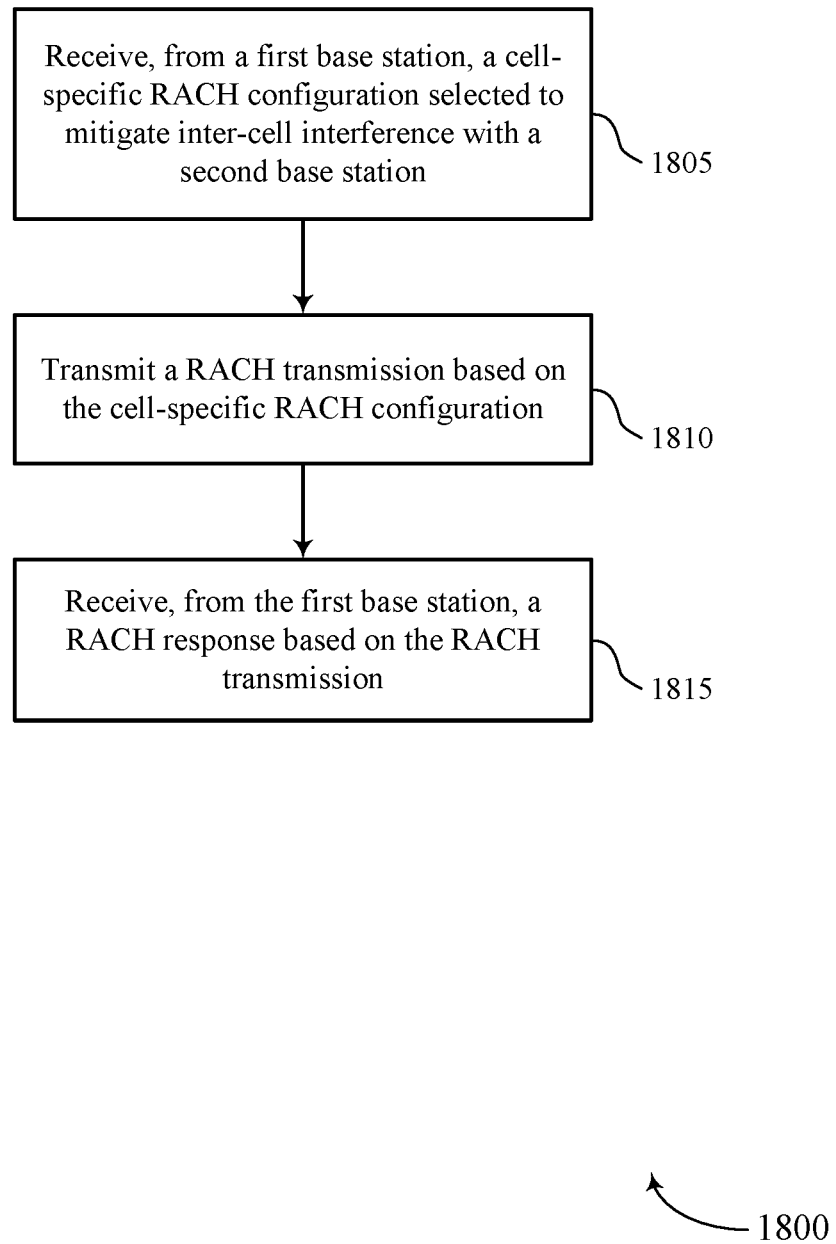

FIG. 18 shows a flowchart illustrating a method 1800 that supports inter-cell coordination of RACH transmission in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, from a first base station, a cell-specific RACH configuration selected to mitigate inter-cell interference with a second base station. The operations of 1805 may be performed according to the methods described herein. In some examples, aspects of the operations of 1805 may be performed by a cell-specific RACH configuration component as described with reference to FIGS. 6 through 9.

At 1810, the UE may transmit a RACH transmission based on the cell-specific RACH configuration. The operations of 1810 may be performed according to the methods described herein. In some examples, aspects of the operations of 1810 may be performed by a MsgA transmission component as described with reference to FIGS. 6 through 9.

At 1815, the UE may receive, from the first base station, a RACH response based on the RACH transmission. The operations of 1815 may be performed according to the methods described herein. In some examples, aspects of the operations of 1815 may be performed by a MsgB reception component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a first base station, comprising:
   exchanging random access configuration information with a second base station;
   selecting a cell-specific random access channel configuration to mitigate inter-cell interference with the second base station based at least in part on the random access configuration information;
   transmitting, to a user equipment (UE) served by the first base station, the cell-specific random access channel configuration that indicates a cell-specific muting pattern configuration;
   receiving, from the UE and based at least in part on the cell-specific random access channel configuration, a random access channel transmission in accordance with the cell-specific muting pattern configuration; and
   transmitting, to the UE, a random access channel response based at least in part on the random access channel transmission.

2. The method of claim 1, wherein transmitting the cell-specific random access channel configuration comprises:
   transmitting a cell-specific resource configuration for a preamble.

3. The method of claim 2, wherein the cell-specific resource configuration indicates a first preamble sequence from a plurality of different preamble sequences, wherein receiving the random access channel transmission comprises:
   receiving the random access channel transmission that comprises the preamble generated based at least in part on the first preamble sequence.

4. The method of claim 2, wherein the cell-specific resource configuration indicates a first transmission occasion from a plurality of different transmission occasions, wherein receiving the random access channel transmission comprises:
   receiving the random access channel transmission within the first transmission occasion.

5. The method of claim 1, wherein transmitting the cell-specific random access channel configuration comprises:
   transmitting a cell-specific resource configuration for a payload.

6. The method of claim 5, wherein the cell-specific resource configuration indicates a first base sequence from a plurality of different base sequences, wherein receiving the random access channel transmission comprises:
   receiving the random access channel transmission that comprises the payload generated based at least in part on the first base sequence.

7. The method of claim 5, wherein the cell-specific resource configuration indicates a first antenna port mapping scheme from a plurality of different antenna port mapping schemes, wherein receiving the random access channel transmission comprises:
   receiving the random access channel transmission based at least in part on the first antenna port mapping scheme.

8. The method of claim 5, wherein the cell-specific resource configuration indicates a first transmission occasion from a plurality of different transmission occasions, wherein receiving the random access channel transmission comprises:
   receiving the random access channel transmission within the first transmission occasion.

9. The method of claim 1, wherein transmitting the cell-specific random access channel configuration comprises:
   transmitting a beam configuration that indicates a first transmission beam from a plurality of different transmission beams, wherein receiving the random access channel transmission comprises:
   receiving the random access channel transmission using a receive beam corresponding to the first transmission beam.

10. The method of claim 1, wherein transmitting the cell-specific random access channel configuration comprises:
    transmitting the cell-specific random access channel configuration that indicates a scrambling set extension of reference signal sequences, wherein receiving the random access channel transmission comprises:
    receiving the random access channel transmission that comprises a payload scrambled based at least in part on the scrambling set extension of the reference signal sequences.

11. The method of claim 1, wherein transmitting the cell-specific random access channel configuration comprises:
    transmitting the cell-specific random access channel configuration that indicates a hopping pattern of reference signal sequences across different symbols, wherein receiving the random access channel transmission comprises:
    receiving the random access channel transmission based at least in part on the hopping pattern.

12. The method of claim 1, wherein transmitting the cell-specific random access channel configuration comprises:
    transmitting the cell-specific random access channel configuration that indicates a resource block hopping pattern for a reference signal, a shared data channel transmission, or both, wherein receiving the random access channel transmission comprises:
    receiving the random access channel transmission based at least in part on the resource block hopping pattern.

13. The method of claim 1, wherein transmitting the cell-specific random access channel configuration comprises:
    transmitting the cell-specific random access channel configuration that indicates a power control configuration, wherein receiving the random access channel transmission comprises:
    receiving the random access channel transmission based at least in part on the power control configuration.

14. The method of claim 1, wherein transmitting the cell-specific random access channel configuration comprises:
    transmitting the cell-specific random access channel configuration that indicates a random access channel type configuration, wherein receiving the random access channel transmission comprises:
    receiving the random access channel transmission based at least in part on the random access channel type configuration.

15. The method of claim 1, wherein transmitting the cell-specific random access channel configuration comprises:
    transmitting the cell-specific random access channel configuration that indicates a transmit beam coordination configuration, wherein receiving the random access channel transmission comprises:
    receiving the random access channel transmission based at least in part on the transmit beam coordination configuration.

16. The method of claim 1, wherein transmitting the cell-specific random access channel configuration comprises signaling a cell identifier of the first base station, a preamble identifier, or both, wherein receiving the random access channel transmission comprises:
receiving the random access channel transmission that comprises a payload scrambled based at least in part on the cell identifier of the first base station, the preamble identifier, or both.

17. The method of claim 1, further comprising:
performing scrambling of a reference signal sequence to generate a scrambled reference signal sequence based at least in part on a preamble sequence identifier and a scrambling configuration indicated in the cell-specific random access channel configuration, wherein receiving the random access channel transmission comprises:
receiving the random access channel transmission that comprises the scrambled reference signal sequence.

18. The method of claim 1, wherein the random access configuration information indicates a time allocation, a frequency allocation, or both, for a preamble.

19. A method for wireless communications by a user equipment (UE), comprising:
receiving, from a first base station, a cell-specific random access channel configuration selected to mitigate inter-cell interference with a second base station, wherein the cell-specific random access channel configuration indicates a cell-specific muting pattern configuration;
transmitting, based at least in part on the cell-specific random access channel configuration, a random access channel transmission in accordance with the cell-specific muting pattern configuration; and
receiving, from the first base station, a random access channel response based at least in part on the random access channel transmission.

20. The method of claim 19, wherein receiving the cell-specific random access channel configuration comprises:
receiving a cell-specific resource configuration for a preamble.

21. The method of claim 19, wherein receiving the cell-specific random access channel configuration comprises:
receiving a cell-specific resource configuration for a payload.

22. The method of claim 19, wherein receiving the cell-specific random access channel configuration comprises:
receiving a beam configuration that indicates a first transmission beam from a plurality of different transmission beams, wherein transmitting the random access channel transmission comprises:
transmitting the random access channel transmission using the first transmission beam.

23. The method of claim 19, wherein receiving the cell-specific random access channel configuration comprises:
receiving the cell-specific random access channel configuration that indicates a scrambling set extension of reference signal sequences, wherein transmitting the random access channel transmission comprises:
scrambling a payload to generate a scrambled payload based at least in part on the scrambling set extension of the reference signal sequences; and
transmitting the random access channel transmission that comprises the scrambled payload.

24. The method of claim 19, wherein receiving the cell-specific random access channel configuration comprises:
receiving the cell-specific random access channel configuration that indicates a hopping pattern of reference signal sequences across different symbols, wherein transmitting the random access channel transmission comprises:
transmitting the random access channel transmission based at least in part on the hopping pattern.

25. The method of claim 19, wherein receiving the cell-specific random access channel configuration comprises:
receiving the cell-specific random access channel configuration that indicates a resource block hopping pattern for a reference signal, a shared data channel transmission, or both, wherein transmitting the random access channel transmission comprises:
transmitting the random access channel transmission based at least in part on the resource block hopping pattern.

26. An apparatus for wireless communications by a first base station, comprising:
a processor;
memory coupled to the processor; and
instructions stored in the memory and executable by the processor to cause the apparatus to:
exchange random access configuration information with a second base station;
select a cell-specific random access channel configuration to mitigate inter-cell interference with the second base station based at least in part on the random access configuration information;
transmit, to a user equipment (UE) served by the first base station, the cell-specific random access channel configuration that indicates a cell-specific muting pattern configuration;
receive, from the UE and based at least in part on the cell-specific random access channel configuration, a random access channel transmission in accordance with the cell-specific muting pattern configuration; and
transmit, to the UE, a random access channel response based at least in part on the random access channel transmission.

27. An apparatus for wireless communications by a user equipment (UE), comprising:
a processor;
memory coupled to the processor; and
instructions stored in the memory and executable by the processor to cause the apparatus to:
receive, from a first base station, a cell-specific random access channel configuration selected to mitigate inter-cell interference with a second base station, wherein the cell-specific random access channel configuration indicates a cell-specific muting pattern configuration;
transmit, based at least in part on the cell-specific random access channel configuration, a random access channel transmission in accordance with the cell-specific muting pattern configuration; and
receive, from the first base station, a random access channel response based at least in part on the random access channel transmission.

* * * * *